(12) United States Patent
Goodenough et al.

(10) Patent No.: US 8,979,261 B2
(45) Date of Patent: Mar. 17, 2015

(54) SILICONE HYDROGEL OPHTHALMIC DEVICES MOLDED IN VINYL ALCOHOL COPOLYMER MOLDS AND RELATED METHODS

(75) Inventors: Neil Goodenough, Southampton (GB); David Robert Morsley, Eastleigh (GB); Ian Bruce, Southampton (GB); Edyta S. Bialek, Southampton (GB); Lee Darren Norris, Southampton (GB)

(73) Assignee: CooperVision International Holding Company, LP, St. Michael (BB)

( * ) Notice: Subject to any disclaimer, the term of this patent is extended or adjusted under 35 U.S.C. 154(b) by 297 days.

(21) Appl. No.: 13/810,679

(22) PCT Filed: Jun. 13, 2011

(86) PCT No.: PCT/GB2011/051102
§ 371 (c)(1),
(2), (4) Date: Mar. 13, 2013

(87) PCT Pub. No.: WO2012/013947
PCT Pub. Date: Feb. 2, 2012

(65) Prior Publication Data
US 2013/0176530 A1    Jul. 11, 2013

Related U.S. Application Data

(60) Provisional application No. 61/369,116, filed on Jul. 30, 2010.

(51) Int. Cl.
*B29D 11/00* (2006.01)
*G02B 1/04* (2006.01)
*B29C 33/40* (2006.01)

(52) U.S. Cl.
CPC .... *B29D 11/00413* (2013.01); *B29D 11/00009* (2013.01); *B29C 33/40* (2013.01); *B29D 11/00038* (2013.01); *G02B 1/043* (2013.01)
USPC ....................................... 351/159.33; 264/2.6

(58) Field of Classification Search
None
See application file for complete search history.

(56) References Cited

U.S. PATENT DOCUMENTS

| 4,143,949 A | 3/1979 | Chen |
| 5,326,505 A | 7/1994 | Adams et al. |
| 5,789,461 A | 8/1998 | Nicolson et al. |

(Continued)

FOREIGN PATENT DOCUMENTS

| EP | 1882576 A1 | 1/2008 |
| EP | 1930243 A1 | 6/2008 |

(Continued)

OTHER PUBLICATIONS

Technical data sheet for DMS-R18 from Gelest, 1 page, no specific date given.*

(Continued)

*Primary Examiner* — Robert S Loewe
(74) *Attorney, Agent, or Firm* — Kilyk & Bowersox, P.L.L.C.

(57) ABSTRACT

Silicone hydrogel ophthalmic devices, such as ocular inserts and contact lenses, formed in direct contact with molds comprising at least one vinyl alcohol copolymer and related methods are described. The at least one vinyl alcohol copolymer of the molds is a vinyl alcohol copolymer other than an ethylene-vinyl alcohol copolymer. The methods of manufacturing ophthalmic devices can use dry or wet demolding processes, or dry or wet delensing processes.

19 Claims, 1 Drawing Sheet

(56) References Cited

U.S. PATENT DOCUMENTS

| | | |
|---|---|---|
| 6,310,116 B1 | 10/2001 | Yasuda et al. |
| 6,465,538 B2 | 10/2002 | Lai |
| 6,867,245 B2 | 3/2005 | Iwata et al. |
| 7,320,587 B2 | 1/2008 | Goodenough et al. |
| 7,540,609 B2 | 6/2009 | Chen et al. |
| 7,691,916 B2 | 4/2010 | McCabe et al. |
| 7,750,079 B2 | 7/2010 | Almond et al. |
| 2005/0013842 A1 | 1/2005 | Qiu et al. |
| 2006/0073185 A1* | 4/2006 | Jani et al. ............ 424/427 |
| 2006/0251696 A1* | 11/2006 | Winterton et al. ......... 424/422 |
| 2007/0138692 A1 | 6/2007 | Ford et al. |
| 2007/0149428 A1* | 6/2007 | Ammon et al. ............ 510/112 |
| 2007/0216045 A1 | 9/2007 | Francis |
| 2007/0291223 A1 | 12/2007 | Chen et al. |
| 2008/0001317 A1 | 1/2008 | Tokarski et al. |
| 2008/0307751 A1* | 12/2008 | Newman et al. ............ 53/425 |
| 2009/0121370 A1 | 5/2009 | Barrows et al. |
| 2013/0161846 A1 | 6/2013 | Goodenough et al. |
| 2013/0162943 A1 | 6/2013 | Goodenough et al. |
| 2013/0169926 A1 | 7/2013 | Goodenough et al. |
| 2013/0169927 A1 | 7/2013 | Goodenough et al. |
| 2013/0188125 A1 | 7/2013 | Goodenough et al. |

FOREIGN PATENT DOCUMENTS

| | | |
|---|---|---|
| EP | 2181836 A2 | 5/2010 |
| GB | 2481761 B | 9/2012 |
| GB | 2485015 B | 12/2012 |
| JP | 5549288 B2 | 12/1980 |
| JP | 63-046232 | 2/1988 |
| JP | 11-172149 | 6/1999 |
| JP | 11-287971 | 10/1999 |
| JP | 2004-075866 | 3/2004 |
| JP | 2004314416 A | 11/2004 |
| JP | 2006-089538 | 4/2006 |
| JP | 2009-542470 A | 12/2009 |
| WO | 2008-002398 A2 | 1/2008 |
| WO | 2008021822 A3 | 2/2008 |
| WO | 2010011492 A1 | 1/2010 |
| WO | 2010011493 A1 | 1/2010 |
| WO | 2010065686 A1 | 6/2010 |
| WO | 2010078150 A1 | 7/2010 |

OTHER PUBLICATIONS

Lai et al., "Surface wettability enhancement of silicone hydrogel lenses by processing with polar plastic molds," J. Biomed Mater Res., 35, 1997, pp. 349-356.

International Search Report and Written Opinion issued in corresponding International Patent Application No. PCT/GB2011/051102 dated Nov. 17, 2011.

International Preliminary Report on Patentability issued in corresponding International Patent Application No. PCT/GB2011/051102 dated Oct. 8, 2012 (with Letter accompanying Demand for International Preliminary Examination and Article 34 claims (amended pp. 74-78) filed with IPEA (EPO) on Apr. 19, 2012).

Office Action received in corresponding Japanese Patent Application No. 2013-522298 dated Oct. 16, 2014 with English translation (10 pages)

Office Action received in corresponding Japanese Patent Application No. 2013-522299 dated Nov. 5, 2014 with . English translation (6 pages).

* cited by examiner

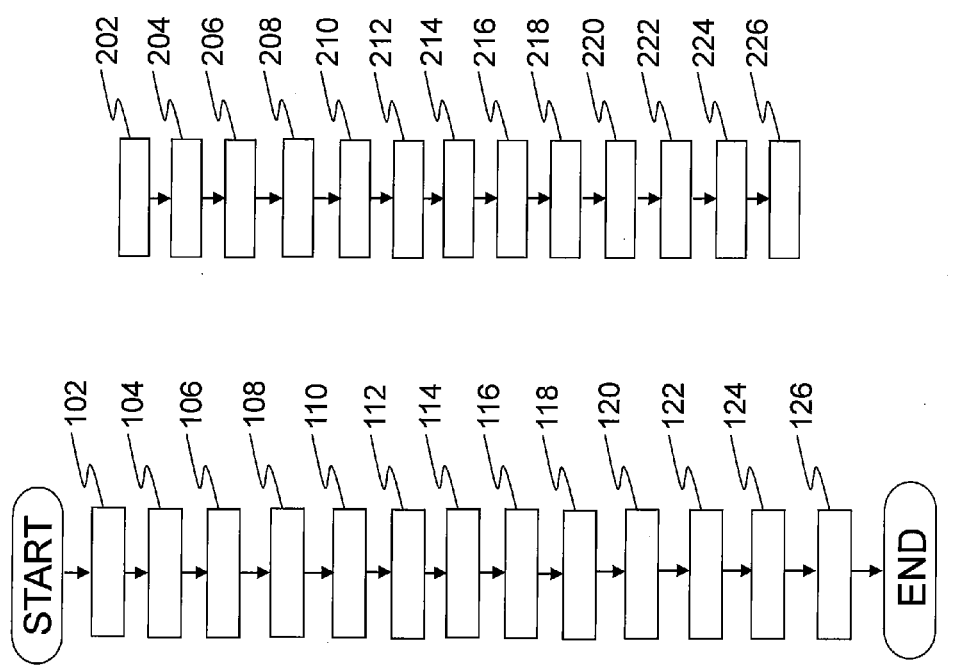

SILICONE HYDROGEL OPHTHALMIC DEVICES MOLDED IN VINYL ALCOHOL COPOLYMER MOLDS AND RELATED METHODS

This application is a National Stage Application of PCT/GB2011/051102, filed Jun. 13, 2011, which claims priority to U.S. Provisional Patent Application No. 61/369,116, filed Jul. 30, 2010.

FIELD

The present disclosure relates to silicone hydrogel ophthalmic devices formed using molds comprising a vinyl alcohol copolymer other than an ethylene-vinyl alcohol copolymer, and related methods.

BACKGROUND

In cast molding methods of producing ophthalmic devices, such as ocular inserts and contact lenses, a reaction mixture or polymerizable composition is commonly cured in a device-shaped cavity defined by a first mold member with a device-forming molding surface and a second mold member with a device-forming molding surface, or a female and male mold member, respectively. The mold members are typically produced by injection molding a thermoplastic polymer into mold-shaped cavities. Examples of thermoplastic polymers which can be used to make ophthalmic device molds include non-polar thermoplastic polymers, such as polypropylene, polystyrene, and polyethylene; and polar thermoplastic polymers, such as ethylene-vinyl alcohol copolymers and poly(vinyl alcohol) homopolymers. When cast molding ophthalmic devices, after placing the polymerizable composition in the first mold member, the first and second mold members are placed together or coupled together to form a mold assembly with an ophthalmic device-shaped cavity therebetween. The mold assembly is then cured to polymerize the polymerizable composition, forming the polymeric ophthalmic device in the device-shaped cavity of the mold assembly.

Contact lenses, including silicone hydrogel contact lenses, have been cast molded in molds made of ethylene-vinyl alcohol (EVOH) copolymers, for example SOARLITE™ S available from Nippon Gohsei, Ltd., Osaka, Japan. Molding silicone hydrogel lenses in EVOH molds has been found to result in lenses having ophthalmically acceptably wettable surfaces. Previously, it was necessary to apply a surface treatment such as, for example a plasma treatment, or to include an interpenetrating network of a polymeric wetting agent in silicone hydrogel ophthalmic devices in order for the device surfaces to be ophthalmically acceptably wettable when hydrated. However, EVOH is an expensive material which is essentially insoluble in water. The high cost of EVOH molds can negatively impact production costs. Additionally, EVOH copolymers typically have high levels of crystallinity of about 40% or higher (i.e., the EVOH copolymer typically is composed of 60% or less amorphous material). The high level of crystalline content in these materials results in the materials being opaque, which can be problematic in a molding material. Also, it can be difficult to release the polymeric ophthalmic device body from EVOH mold members following curing, which can negatively impact device yields and production costs.

It has also been proposed to use poly(vinyl alcohol) homopolymers (PVOH), including modified forms of PVOH, to form ophthalmic device molds, including contact lens molds. In some cases, the level of crystallinity of some forms of PVOH can be high (and consequently the level of amorphous content low), such as, for example, about 48% or more. However, the use of many forms of PVOH has been found not to be ideal for use as ophthalmic device lens molds. For example, as the traditional melt processing temperature and thermal degradation temperature of unmodified PVOH are almost the same, it is very difficult to use these materials to injection mold ophthalmic device molds.

While some modified forms of PVOH have been proposed for use as ophthalmic device molds, these modified forms of PVOH still retain some of the undesirable properties of unmodified PVOH, such as, for example, high crystalline content which can reduce light transmission through the material. Although the prospect of using forms of PVOH to mold ophthalmic devices could be attractive, these undesirable properties make it difficult to use either modified or unmodified forms of PVOH in commercial production of ophthalmic devices, including ocular inserts and contact lenses.

In view of the above, it can be appreciated that a need exists for ophthalmic device molds comprising new types of materials for cast molding ophthalmic devices including silicone hydrogel ophthalmic devices, for new ophthalmic devices cast molded using molds comprising these new types of materials, for packaged ophthalmic devices cast molded using molds comprising these new types of materials, and for associated manufacturing methods which use these new types of materials which can be less expensive and more process-friendly. A need exists particularly for highly amorphous materials which can be used to form molds suitable for molding contact lenses.

All publications, including patents, published patent applications, scientific or trade publications and the like, cited in this specification are hereby incorporated herein in their entirety.

SUMMARY

The present disclosure is directed to a method of manufacturing a silicone hydrogel ophthalmic device, comprising: providing a polymerizable composition, the polymerizable composition comprising (a) at least one siloxane monomer, (b) at least one hydrophilic monomer, and (c) at least one crosslinking agent; polymerizing the polymerizable composition in an ophthalmic device mold assembly to form a polymeric ophthalmic device body, wherein at least one mold member of the ophthalmic device mold assembly comprises at least one vinyl alcohol copolymer which is not an ethylene-vinyl alcohol copolymer; contacting the polymeric ophthalmic device body with a washing liquid to remove extractable material from the polymeric ophthalmic device body; and packaging the polymeric ophthalmic device body in an ophthalmic device packaging solution in an ophthalmic device package.

In one example, the silicone hydrogel ophthalmic device can be a silicone hydrogel contact lens, the ophthalmic device mold assembly can be a contact lens mold assembly, the polymeric ophthalmic device body can be a polymeric contact lens body, the ophthalmic device packaging solution can be a contact lens packaging solution, and the ophthalmic device package can be a contact lens package.

In another example, following release of the polymeric device body from the mold assembly, a layer of the at least one vinyl alcohol copolymer is not present on a surface of the polymeric device body.

In another example, following release of the polymeric device body from the mold assembly, the device body can be present in a solution comprising the at least one vinyl alcohol copolymer.

In another example, the at least one vinyl alcohol copolymer can comprise a highly amorphous vinyl alcohol copolymer having a level of crystallinity less than 35%.

In another example, the at least one vinyl alcohol copolymer can comprise a water-soluble vinyl alcohol copolymer.

The at least one siloxane monomer of the polymerizable composition can comprise a siloxane monomer having at least one acrylate polymerizable functional group. The at least one siloxane monomer can comprise a siloxane monomer having at least one methacrylate polymerizable functional group. The at least one siloxane monomer can comprise a multi-functional monomer. The at least one siloxane monomer can comprise a bifunctional monomer. The at least one siloxane monomer can comprise a siloxane monomer component comprising a first siloxane monomer and a second siloxane monomer having a different molecular weight than the at least one first siloxane monomer.

The at least one hydrophilic monomer of the polymerizable composition can comprise a vinyl amide-containing monomer. The at least one hydrophilic monomer can comprise a vinyl ether-containing monomer.

The at least one crosslinking agent of the polymerizable composition can comprise a vinyl-containing crosslinking agent. The at least one crosslinking agent can comprise a vinyl ether-containing crosslinking agent. The at least one crosslinking agent can comprise a divinyl ether-containing crosslinking agent.

The polymerizable composition can further comprise at least one hydrophobic ethylene glycol methyl ether methacrylate-containing monomer. The polymerizable composition can further comprise a tinting agent, a UV-blocking agent, or both a tinting agent and a UV-blocking agent.

The at least one mold member of the ophthalmic device mold assembly comprising at least one vinyl alcohol copolymer which is not an ethylene-vinyl alcohol copolymer can be formed by injection molding the at least one vinyl alcohol copolymer. The process of injection molding the at least one vinyl alcohol copolymer can use a process setting selected from the group consisting of: melt temperature from about 180° C. to about 250° C., barrel temperature from about 180° C. to about 250° C., throat temperature from about 30° C. to about 70° C., mold tool temperature from about 30° C. to about 95° C., holding time from about 1 second to about 5 seconds, injection speed from about 50 mm/second to about 250 mm/second, plasticizing speed from about 100 mm/second to about 300 mm/second, injection pressure from about 50 Bar to about 180 Bar, holding pressure from about 10 Bar to about 200 Bar, back pressure from about 5 Bar to about 25 Bar, and any combination thereof. In one example, at least two of the above process settings can be used. In another example, at least three of the above process settings can be used. In yet another example, at least four of the above process settings can be used.

The method can further comprise the step of releasing the polymeric ophthalmic device body from the at least one mold member of the ophthalmic device mold assembly comprising the at least one vinyl alcohol copolymer which is not an ethylene-vinyl alcohol copolymer. The step of releasing the device body from the at least one mold member can comprise a wet demolding step, a wet delensing step, or a wet demolding and delensing step. In one example, the wet demolding step, wet delensing step or wet demolding and delensing step can result in the mold member comprising the at least one vinyl alcohol copolymer being at least partially dissolved.

The present disclosure is also directed to a silicone hydrogel ophthalmic device, comprising: a polymeric ophthalmic device body that is a reaction product of a polymerizable composition, the polymerizable composition comprising (a) at least one siloxane monomer, (b) at least one hydrophilic monomer, and (c) at least one crosslinking agent; wherein the polymeric ophthalmic device body is a cast-molded device body formed in an ophthalmic device mold assembly, at least one mold member of the ophthalmic device mold assembly comprising at least one vinyl alcohol copolymer which is not an ethylene-vinyl alcohol copolymer.

The present disclosure is also directed to a packaged silicone hydrogel contact lens product, comprising: a polymeric contact lens body that is a reaction product of a polymerizable composition, the polymerizable composition comprising (a) at least one siloxane monomer, (b) at least one hydrophilic monomer, and (c) at least one crosslinking agent; a portion of contact lens packaging solution comprising at least one water-soluble vinyl alcohol copolymer; and a contact lens package configured to contain a contact lens body in the portion of contact lens packaging solution.

Any and all features described herein and any combination of such features are included within the scope of the present application provided that the features of any such combination are not mutually inconsistent. In addition, any feature or combination of features may be specifically excluded from any example of the present disclosure.

BRIEF DESCRIPTION OF THE DRAWINGS

FIG. 1 is a flow chart illustrating steps of a method for producing an ophthalmic device.

FIG. 2 is a flow chart illustrating certain inputs and outputs of the method of FIG. 1.

DETAILED DESCRIPTION

It has been discovered that ophthalmic device molds, including ocular insert molds and contact lens molds, made of at least one vinyl alcohol copolymer can be used to form silicone hydrogel polymeric ophthalmic device bodies, e.g., silicone hydrogel polymeric ocular insert device bodies and silicone hydrogel polymeric contact lens bodies.

As used herein, a vinyl alcohol copolymer is a polymer comprising at least one unit of a vinyl alcohol functional group, and at least one unit of a functional group which is not vinyl alcohol. A vinyl alcohol copolymer is distinct from a vinyl alcohol homopolymer, which is a polymer comprising only vinyl alcohol functional groups. In accordance with the present disclosure, it is to be understood that a vinyl alcohol copolymer refers to a vinyl alcohol copolymer other than an ethylene-vinyl alcohol copolymer (i.e., the vinyl alcohol copolymer of the present disclosure is not comprised of units of ethylene). The vinyl alcohol copolymer can be understood to be a vinyl alcohol copolymer essentially free of ethylene units. The vinyl alcohol copolymer can be a vinyl alcohol copolymer which does not comprise ethylene-vinyl alcohol units having a structure represented by structure (1):

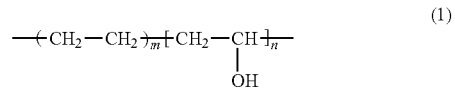

where m and n of structure (1) independently are integers of 1 or greater.

A "monomer" refers to a polymerizable compound, regardless of the molecular weight of the compound. Thus, a monomer can be a low molecular weight monomer, a macromer, or a pre-polymer as described below.

A "low molecular weight monomer" refers to a relatively low molecular weight compound, for example a compound with an average molecular weight less than 700 Daltons that is polymerizable. In one example, a low molecular weight monomer can comprise a single unit of a molecule containing one or more functional groups capable of polymerizing to combine with other molecules to form a polymer, the other molecules being of the same structure or different structures as the low molecular weight monomer.

A "macromer" refers to medium and high molecular weight compounds or polymers, which can contain one or more functional groups capable of polymerization or further polymerization. For example, a macromer can be a compound or polymer with an average molecular weight of from about 700 Daltons to about 2,000 Daltons.

A "prepolymer" refers to a polymerizable or crosslinkable higher molecular weight compound. A prepolymer, as used herein can contain one or more functional groups. In one example, a prepolymer can be a series of monomers or macromers bonded together such that the overall molecule remains polymerizable or crosslinkable. For example, a prepolymer can be a compound with an average molecular weight greater than about 2,000 Daltons.

A "polymer" refers to a material formed by polymerizing one or more monomers, macromers, prepolymers or mixtures thereof. As used herein, a polymer is understood to refer to a molecule that is not capable of being polymerized, but is capable of being crosslinked to other polymers, for example, to other polymers present in a polymerizable composition or during the reaction of monomers, macromers and/or prepolymers to form other polymers in a polymerizable composition.

A "network" of a hydrophilic polymer typically means that crosslinks are formed between polymer chains by covalent bonds or by physical bonds, e.g. hydrogen bonds. A network can include two or more polymeric components, and can include an interpenetrating network (IPN) in which one polymer is physically entangled with a second polymer such that there are few, if any, covalent bonds between them, but the polymers cannot be separated from each other without destroying the network.

An "interpenetrating network" or "IPN" refers to a combination of two or more different polymers, in network form, of which at least one is synthesized (e.g., polymerized) and/or cross-linked in the presence of the other without or substantially without any covalent bonds between them. An IPN can be composed of two kinds of chains forming two separate networks, but in juxtaposition or interpenetrating. Examples of IPNs include sequential IPNs, simultaneous IPNs, and homo-IPNs.

A "pseudo-IPN" refers to a polymeric reaction product where at least one of the different polymers is cross-linked while at least one other polymer is non-crosslinked (e.g. linear or branched), wherein the non-cross-linked polymer is distributed in and held by the cross-linked polymer on a molecular scale such that the non-cross-linked polymer is substantially unextractable from the network.

The present silicone hydrogel ophthalmic devices comprise, or consist of, hydrated device bodies comprising a polymeric component and a liquid component. The polymeric component comprises polymerized units of the at least one siloxane monomer, the at least one hydrophilic monomer, and the at least one crosslinking agent. As used herein, "silicone hydrogel" refers to a particular type of polymeric hydrogel that includes a silicone (SiO) component and which is capable of absorbing a relatively high level water, such as, for example, an equilibrium water content of at least 10% wt/wt. A silicone hydrogel ophthalmic device is an ophthalmic device, including, for example, an ophthalmic insert or a vision correcting contact lens, which is formed of a polymeric silicone hydrogel material. When the polymerizable composition of the present disclosure is reacted and polymerized, it can therefore be understood that the silicone hydrogel polymer formed is the reaction product of the polymerizable composition, and thus is a polymer composed units corresponding to the polymerizable components of the polymerizable composition, i.e., units of the at least one siloxane monomer, units of the at least one hydrophilic monomer, units of the at least one non-silicon containing crosslinking agent, and units of any additional polymerizable ingredients optionally present in the polymerizable composition. As used herein, a polymerizable ingredient is understood to be a compound which has a polymerizable double bond as part of its molecular structure. Thus, a non-polymerizable ingredient does not have a polymerizable double bond as part of its molecular structure.

A siloxane monomer is a monomer that contains at least one siloxane [—Si—O—Si—] linkage. In a siloxane monomer, each silicon atom may optionally possess one or more organic radical substituents ($R_1$, $R_2$) or substituted organic radical substituents that may be the same or different, e.g., —$SiR_1R_2O$—. Similarly, a non-silicon containing ingredient is an ingredient containing less than 0.1% (wt/wt) silicon.

The polymerizable compositions of the present disclosure comprise at least one siloxane monomer. The at least one siloxane monomer can be present as a single siloxane monomer, or can be present as a siloxane monomer component composed of two or more siloxane monomers, for example a first siloxane monomer, a second siloxane monomer, a third siloxane monomer, etc.

The siloxane monomer can be a multifunctional siloxane monomer. If the siloxane monomer has two functional groups, such as two methacrylate groups, it is a bifunctional monomer. If the siloxane monomer has three functional groups, it is a trifunctional monomer.

The siloxane monomer can be a siloxane monomer having a polymerizable functional group present on one end of the main chain of the monomer. The siloxane monomer can be a siloxane monomer having a polymerizable functional group on both ends of the main chain of the monomer. The siloxane monomer can be a siloxane monomer having a polymerizable functional group present on at least one side chain of the monomer. The siloxane monomer can be a siloxane monomer having a polymerizable functional group present on only one side chain of the monomer.

The siloxane monomer can be an acrylate-containing siloxane monomer, in other words, a siloxane monomer having at least one acrylate polymerizable functional group as part of its molecular structure. In one example, the acrylate-containing siloxane monomer can be a methacrylate-containing siloxane monomer, i.e., a siloxane monomer having at least one methacrylate polymerizable functional group as part of its molecular structure.

The siloxane monomer can be a siloxane monomer having a number average molecular weight of at least 3,000 daltons. In another example, the siloxane monomer can be a siloxane monomer having a molecular weight of at least 4,000 daltons, or of at least 7,000 daltons, or of at least 9,000 daltons, or of at least 11,000 daltons.

The siloxane monomer can be a siloxane monomer having a molecular weight less than 20,000 daltons. In another example, the siloxane monomer can be a siloxane monomer having a molecular weight less than 15,000 daltons, or less than 11,000 daltons, or less than 9,000 daltons, or less than 7,000 daltons, or less than 5,000 daltons.

The siloxane monomer can be a siloxane monomer having a molecular weight from 3,000 daltons to 20,000 daltons. In another example, the siloxane monomer can be a siloxane monomer having a molecular weight from 5,000 daltons to 20,000 daltons, or from 5,000 daltons to 10,000 daltons, or from 7,000 daltons to 15,000 daltons.

In one example, the siloxane monomer can have more than one functional group and can have a number average molecular weight of at least 3,000 daltons.

In one example, the at least one siloxane monomer can comprise or consist of a single siloxane monomer, or can comprise or consist of a siloxane monomer component composed of two or more siloxane monomers. The siloxane monomer component can comprise or consist of a first siloxane monomer having a molecular weight less than about 2,000 daltons, and a second siloxane monomer having a molecular weight greater than about 3,000 daltons. The first siloxane monomer and the second siloxane monomer can be present in the polymerizable composition in a ratio of unit parts of the first siloxane monomer present in the polymerizable composition to unit parts of the second siloxane monomer present in the polymerizable composition of at least 2:1. For example, the ratio can be at least 3:1, or at least 4:1, or can be a ratio of about 4:1.

The siloxane monomer can include poly (organosiloxane) monomers or macromers or prepolymers, such as, for example, 3-[tris(trimethylsiloxy)silyl]propyl allyl carbamate, or 3-[tris(trimethylsiloxy)silyl]propyl vinyl carbamate, or trimethylsilylethyl vinyl carbonate, or trimethylsilylmethyl vinyl carbonate, or 3-[tris(trimethylsilyloxy)silyl]propyl methacrylate (TRIS), or 3-methaycryloxy-2-hydroxypyloxy)propylbis(trimethylsiloxy)methylsilane (SiGMA), or methyldi (trimethylsiloxy)silylpropylglycerolethyl methacrylate (SiGEMA), or monomethacryloxypropyl terminated polydimethylsiloxane (MCS-M11), MCR-M07, or monomethacryloxypropyl terminated mono-n-butyl terminated polydimethyl siloxane (mPDMS), or any combination thereof. In one example of a polymerizable composition of the present disclosure, the optional siloxane monomer can comprise a first siloxane monomer and a second siloxane monomer, wherein the second siloxane monomer differs from the first siloxane present in the polymerizable composition based on molecular weight, molecular structure, or both molecular weight and structure. For example, the optional second siloxane monomer or at least one third siloxane monomer can be a siloxane monomer of formula (2) having a different molecular weight than the first siloxane monomer of the polymerizable composition. In another example, the siloxane monomer or the optional second siloxane monomer or at least one third siloxane can comprise at least one of the siloxanes disclosed in the following patents: US2007/0066706, US2008/0048350, U.S. Pat. No. 3,808, 178, U.S. Pat. No. 4,120,570, U.S. Pat. No. 4,136,250, U.S. Pat. No. 4,153,641, U.S. Pat. No. 470,533, U.S. Pat. No. 5,070,215, U.S. Pat. No. 5,998,498, U.S. Pat. No. 5,760,100, U.S. Pat. No. 6,367,929, and EP080539, the entire content of which are hereby incorporated by reference.

In another example of the present contact lenses, the siloxane monomer can be a dual-end methacrylate end-capped polydimethylsiloxane having a number average molecular weight of at least 4,000 daltons. It will be understood that such siloxane monomers are bifunctional.

In one example of the present contact lenses, the siloxane monomer can have a number average molecular weight of at least 4,000 daltons, or at least 7,000 daltons, or at least 9,000 daltons, or at least 11,000 daltons. The number average molecular weight of the siloxane monomer can be less than 20,000 daltons. Thus, in some contexts, the siloxane monomer can be considered a macromer, but it will be referred to as a monomer herein since it forms a unit part of a polymer formed with the other reactive components of the polymerizable composition.

As used herein, a polymerizable ingredient which can be reacted to form a unit part of a polymer is referred to as a monomer, regardless of its size. The at least one siloxane monomer can comprise a single siloxane monomer, or can comprise a siloxane monomer component composed of two or more siloxane monomers. The at least one siloxane monomer can be a hydrophilic siloxane monomer, or a hydrophobic siloxane monomer, or can have both hydrophilic regions and hydrophobic regions, depending on the amount and location of any hydrophilic components, such as units of ethylene glycol, polyethylene glycol and the like, present in the molecular structure of the siloxane monomers.

In one example, the at least one siloxane monomer of the present disclosure can contain hydrophilic components within the main chain of the siloxane molecule, can contain hydrophilic components within one or more side chains of the siloxane molecule, or any combination thereof. For example, the siloxane monomer can have at least one unit of ethylene glycol adjacent to a polymerizable functional group in the main chain of the siloxane molecule. As used herein, adjacent is understood to mean both immediately adjacent, and separated only by 10 or fewer carbon atoms. The at least one unit of ethylene glycol adjacent to a polymerizable functional group in the main chain of the siloxane molecule can be separated from the polymerizable functional group by a carbon chain 1-5 units in length (i.e., where the ethylene glycol unit is bonded to the first carbon in the carbon chain 1-5 units in length, and the polymerizable functional group is bonded to the last carbon of the carbon chain 1-5 units in length, in other words, the ethylene glycol unit and the polymerizable group are not immediately adjacent but are separated by 1-5 carbon atoms). The siloxane monomer can have at least one unit of ethylene glycol adjacent to polymerizable functional groups present on both ends of the main chain of the siloxane molecule. The siloxane monomer can have at least one unit of ethylene glycol present in at least one side chain of the siloxane molecule. The at least one unit of ethylene glycol present in at least one side chain of the siloxane molecule can be part of a side chain bonded to a silicon atom of the main chain of the siloxane molecule. The siloxane molecule can have both at least one unit of ethylene glycol adjacent to polymerizable functional groups present on both ends of the main chain of the siloxane molecule, and at least one unit of ethylene glycol present in at least one side chain of the siloxane molecule.

Examples of siloxane monomers can include monofunctional siloxane monomers having at least one urethane linkage, such as the examples of the monofunctional siloxane monomers represented by formula (2):

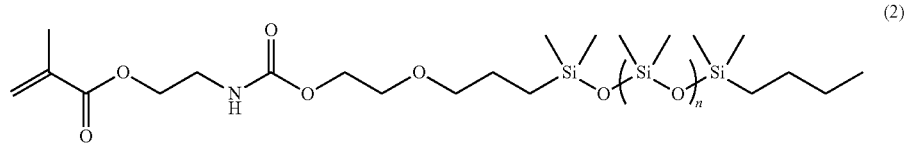

(2)

where n of formula (2) is 0-30, or is 10-15. In a particular example, the siloxane monomer can be the monomer of formula (2) where n of formula (2) is 12-13 and having a molecular weight of about 1,500 daltons. Examples of such monofunctional siloxane monomers described in U.S. Pat. No. 6,867,245, which is hereby incorporated by reference.

Examples of siloxane monomers can include bifunctional siloxane monomers having at least two urethane linkages, such as the examples of the bifunctional siloxane monomers represented by formula (3):

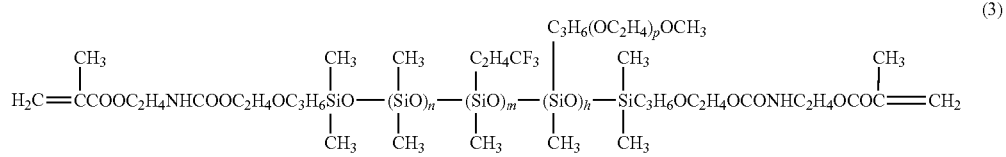

(3)

wherein n of formula (3) is an integer of about 100-150, m of formula (3) is an integer of about 5 to about 10, and h is an integer of about 2 to 8. Additional example of such bifunctional siloxane monomer, and methods of making compounds of formula (3) are described in U.S. Pat. No. 6,867,245, which is hereby incorporated by reference. In a particular example, the siloxane monomer can be a bifunctional siloxane monomer having two urethane linkages and having a molecular weight greater than 10,000 daltons, such as, for example, a molecular weight of greater than about 15,000 daltons.

The siloxane monomer can be a monofunctional siloxane monomer represented by formula (4):

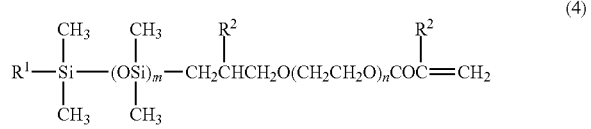

(4)

wherein m of formula (4) represents one integer from 3 to 10, n of formula (4) represents one integer from 1 to 10, $R^1$ of formula (4) is an alkyl group having from 1 to 4 carbon atoms, and each $R^2$ of formula (4) is independently either a hydrogen atom or a methyl group. In other words, on a single molecule of the siloxane monomer represented by formula (4), the first $R^2$ of formula (4), which is bonded to the $CH_2$ group adjacent to the siloxane group, can be either a hydrogen atom or a methyl group, and the second $R^2$ of formula (4), which is bonded to the C of the methacrylate end group, can also be either a hydrogen atom or a methyl group, regardless of whether the first $R^2$ of formula (4) is a hydrogen atom or a methyl group. In a particular example of the siloxane monomer of formula (4), m of formula (4) is 4, n of formula (4) is 1, $R^1$ of formula (4) is a butyl group, and each $R^2$ of formula (4) is independently either a hydrogen atom or a methyl group. The molecular weight of the siloxane monomer of formula (4) can be less than 2,000 daltons. In some examples, the molecular weight of the siloxane monomer of formula (4) is less than 1,000 daltons. Frequently, the molecular weight of the first siloxane monomer is from 400 to 700 daltons. Additional details of the siloxane monomer of formula (4) can be understood from US20090299022, the entire content of which is hereby incorporated by reference. As can be appreciated from formula (4), the first siloxane monomer has a single methacrylic functional end group.

The siloxane monomer can be a bifunctional siloxane monomer represented by formula (5):

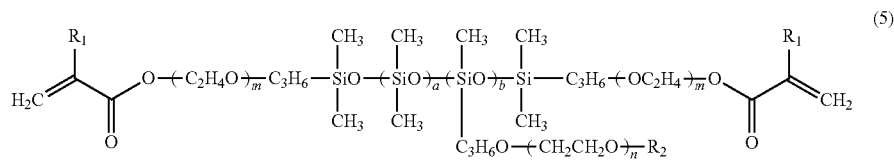

(5)

wherein $R_1$ of formula (5) is selected from either hydrogen atom or a methyl group; $R_2$ of formula (5) is selected from either of hydrogen atom or a hydrocarbon group having 1 to 4 carbon atoms; m of formula (5) represents an integer of from 0 to 10; n of formula (5) represents an integer of from 4 to 100; a and b represent integers of 1 or more; a+b is equal to 20-500; b/(a+b) is equal to 0.01-0.22; and the configuration of siloxane units includes a random configuration. In some examples in which the second siloxane monomer is a monomer represented by formula (5), m of formula (5) is 0, n of formula (5) is an integer from 5 to 15, a is an integer from 65 to 90, b is an integer from 1 to 10, $R_1$ of formula (5) is a methyl group, and $R_2$ of formula (5) is either a hydrogen atom or a hydrocarbon group having 1 to 4 carbon atoms. In one example, the number average molecular weight for this second siloxane monomer represented by formula (5) is from about 9,000 daltons to about 10,000 daltons. In other examples, the second siloxane monomer represented by formula (5) is from about 5,000 daltons to about 10,000 daltons. It can be appreciated that the second siloxane represented by formula (5) is a bifunctional siloxane having two terminal methacrylic groups. Additional details of this second siloxane monomer can be found in US20090234089, the entire content of which is incorporated herein by reference.

The siloxane monomer can be a bifunctional siloxane monomer represented by formula (6):

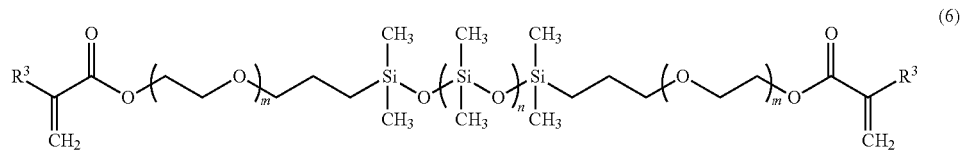

(6)

wherein R3 is selected from either hydrogen atom or a methyl group, m of formula (6) represents an integer from 0 to 15, and n of formula (6) represents an integer from 1 to 500. In one example, the siloxane monomer is represented by formula (6), and R3 is a methyl group, m of formula (6) is 0, and n of formula (6) is one integer from 40 to 60.

In another example, the siloxane monomer can be a bifunctional siloxane monomer represented by formula (7), and is available from Gelest, Inc., Morrisville, Pa. as product code DMS-R18:

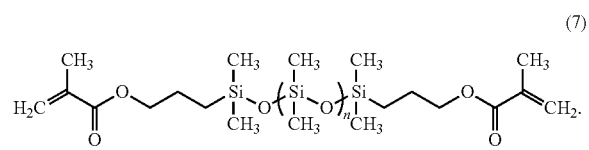

(7)

In one example, the siloxane of formula (7) can have a number average molecular weight of about 4,000 to about 4,500 daltons.

The polymerizable composition can comprise a siloxane monomer component composed of a first siloxane monomer and a second siloxane monomer. The second siloxane monomer can have more than one functional group, or can have a number average molecular weight of at least 3,000 daltons, or can have both more than one functional group and a number average molecular weight of at least 3,000 daltons. If the second siloxane monomer has two functional groups, such as two methacrylate groups, it is a bifunctional monomer. If the second siloxane monomer has three functional groups, it is a trifunctional monomer.

When the polymerizable composition comprises a first siloxane and a second siloxane, the first siloxane monomer and the second siloxane monomer can be present in amounts such that the ratio of the first siloxane monomer to the second siloxane monomer is at least 1:1 based on unit parts, or is at least 2:1 based on unit parts. For example, the first siloxane monomer and the second siloxane monomer can be present in the polymerizable composition in a ratio from about 2:1 to about 10:1 based on unit parts. In another example, the first siloxane monomer and the second siloxane monomer can be present in the polymerizable composition in a ratio from about 3:1 to about 6:1 based on unit parts. In one example, the first siloxane monomer and the second siloxane monomer can be present in the polymerizable composition in a ratio of about 4:1 based on unit parts.

In one example, the total amount of siloxane monomers present in the polymerizable composition (e.g., the sum of the unit parts of the first siloxane monomer, the optional second siloxane monomer, and any other optional siloxane monomers present in the polymerizable composition) can be from about 10 to about 60 unit parts, or from about 25 to about 50 unit parts, or from about 35 to about 40 unit parts.

In one particular example, when the siloxane monomer component comprises a combination of at least two siloxane monomers each having a different molecular weight, the molecular weight of the first siloxane monomer can be less than 2,000 daltons. In some examples, the molecular weight of the first siloxane monomer can be less than 1,000 daltons. Frequently, the molecular weight of the first siloxane monomer is from 400 to 700 daltons.

When the at least one siloxane monomer is present in the polymerizable composition, as previously discussed, the at least one siloxane monomer can comprise a first siloxane monomer and a second siloxane monomer. In one example, the first siloxane monomer can consist of a siloxane monomer of formula (3) and the second siloxane monomer can consist of a siloxane monomer of formula (2). In another example, the first siloxane monomer can consist of a siloxane monomer of formula (2), and the second siloxane monomer con consist of a siloxane monomer of formula (3). In another example, the first siloxane monomer can consist of a siloxane monomer of formula (4), and the second siloxane can consist of a siloxane monomer of formula (5). In another example, the first siloxane monomer can consist of a siloxane monomer of formula (5), and the second siloxane monomer can consist of a siloxane monomer of formula (4). In another example, the first siloxane monomer can consist of a siloxane monomer of formula (2), and the second siloxane monomer can consist of a siloxane monomer of formula (5). In yet another example, the first siloxane monomer can consist of a siloxane monomer of formula (5), and the second siloxane monomer can consist of a siloxane monomer of formula (2). In any or all of the examples described herein, the siloxane monomer component can comprise a third siloxane monomer. For example, the third siloxane monomer can consist of a siloxane monomer of formula (6).

When the polymerizable composition comprises a first siloxane monomer and at least one additional siloxane monomer (i.e., a second siloxane, and optionally a third siloxane monomer, a fourth siloxane monomer, etc.) in combination with at least one cross-linking agent, the siloxane monomers and the at least one vinyl-containing monomer can be present in the polymerizable composition in a ratio of at least about 100:1 based on a ratio of a total number of unit parts of the each siloxane monomer present in the polymerizable composition (i.e., the sum of the unit parts of the first siloxane and the second siloxane monomer and, if present, the third siloxane monomer, etc.) to a total number of unit parts of the least one vinyl-containing cross-linking agent (i.e., the sum of the unit parts of all vinyl-containing cross-linking agents present in the polymerizable composition). For example, the ratio can be from about 50:1 to about 500:1, or from about 100:1 to about 400:1, or from about 200:1 to about 300:1 based on unit parts by weight.

The polymerizable composition of the present disclosure further comprises at least one hydrophilic monomer. The hydrophilicity or hydrophobicity of a monomer (including silicon-containing and non-silicon containing monomers) can be determined using conventional techniques, such as, for example, based on the monomer's aqueous solubility. For purposes of the present disclosure, a hydrophilic monomer is a monomer that is visibly soluble in an aqueous solution at room temperature (e.g. about 20-25 degrees C.). For example, a hydrophilic monomer can be understood to be any monomer for which 50 grams or more of the monomer are visibly fully soluble in 1 liter of water at 20 degrees C. (i.e., the monomer is soluble at a level of at least 5% wt/wt in water) as determined using a standard shake flask method as known to persons of ordinary skill in the art. A hydrophobic monomer, as used herein, is a monomer that is visibly insoluble in an aqueous solution at room temperature, such that separate, visually identifiable phases are present in the aqueous solution, or such that the aqueous solution appears cloudy and separates into two distinct phases over time after sitting at room temperature. For example, a hydrophobic monomer can be understood to be any monomer for which 50 grams of the monomer are not visibly fully soluble in 1 liter of water at 20 degrees C. (i.e., the monomer is soluble at a level of less than 5% wt/wt in water).

The hydrophilic monomer of the present disclosure is understood to be a non-silicone polymerizable ingredient having only one polymerizable functional group present in its molecular structure. The hydrophilic monomer can be understood to comprise a single hydrophilic monomer, or to comprise a hydrophilic monomer component composed of two or more hydrophilic monomers. As used herein, the hydrophilic monomer is understood to be a non-silicon containing hydrophilic monomer, and thus is different from a siloxane monomer.

Examples of hydrophilic monomers which can be included in the present polymerizable compositions can include, for example, N,N-dimethylacrylamide (DMA), or 2-hydroxyethyl acrylate, or 2-hydroxyethyl methacrylate (HEMA), or 2-hydroxypropyl methacrylate, or 2-hydroxybutyl methacrylate (HOB), or 2-hydroxybutyl acrylate, or 4-hydroxybutyl acrylate glycerol methacrylate, or 2-hydroxyethyl methacrylamide, or polyethylene glycol monomethacrylate, or methacrylic acid, or acrylic acid, or any combination thereof.

In one example, the hydrophilic monomer can comprise a hydrophilic vinyl ether-containing monomer. The hydrophilic vinyl ether-containing monomer can comprise or consist of 1,4-butanediol vinyl ether (BVE), or ethylene glycol vinyl ether (EGVE), or di(ethylene glycol) vinyl ether (DEGVE), or tri(ethylene glycol) vinyl ether, or a poly(ethylene glycol) vinyl ether having from 4 to 10 ethylene glycol units, or a poly(ethylene glycol) vinyl ether having more than 10 ethylene glycol units, or any combination thereof. In one example, the hydrophilic monomer component can comprise or consist of BVE. In another example, the hydrophilic monomer component can comprise or consist of EGVE. In yet another example, the hydrophilic vinyl monomer component can comprise or consist of DEGVE. The at least one hydrophilic vinyl ether-containing monomer can comprise or consist of a hydrophilic vinyl ether-containing monomer component consisting of BVE in combination with EGVE, or BVE in combination with DEGVE, or BVE in combination with both EGVE and DEGVE. The hydrophilic vinyl ether-containing monomer can be present in the polymerizable composition in an amount from about 1 to about 20 unit parts by weight. In another example, the hydrophilic vinyl ether-containing monomer can be present in the polymerizable composition from 1 to 15 unit parts, or from 2 to 10 unit parts, or from 3 to 7 unit parts.

In another example, the hydrophilic monomer can comprise or consist of a vinyl-containing monomer which is not a vinyl ether monomer (i.e., a hydrophilic monomer having a vinyl polymerizable functional group which is not a vinyl ether polymerizable functional group). Examples of hydrophilic vinyl-containing monomers which are not vinyl ether-containing monomers which can be provided in the polymerizable compositions include, without limitation, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or N-vinyl-N-ethyl formamide, or N-vinyl formamide, or N-2-hydroxyethyl vinyl carbamate, or N-carboxy-β-alanine N-vinyl ester, or any combination thereof.

In another example, the hydrophilic monomer can comprise or consist of a hydrophilic amide-containing monomer. The hydrophilic amide monomer can be a hydrophilic amide monomer having one N-vinyl group, such as, for example, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or any combination thereof. In one example, the hydrophilic monomer can comprise N-vinyl-N-methyl acetamide (VMA). In one particular example, the hydrophilic monomer can be VMA. The hydrophilic amide-containing monomer can be present in the polymerizable composition in an amount from about 10 to about 60 unit parts by weight.

In another example, the hydrophilic monomer can have any molecular weight, such as a molecular weight less than 400 daltons, or less than 300 daltons, or less than 250 daltons, or less than 200 daltons, or less than 150 daltons, or from about 75 to about 200 daltons.

The hydrophilic monomer can be present in the polymerizable composition in an amount from 30 to 60 unit parts of the polymerizable composition. The hydrophilic monomer can be present in the polymerizable composition from 40 to 55 unit parts, or from 45 to 50 unit parts by weight.

As used herein, a vinyl-containing monomer is a monomer having a single polymerizable carbon-carbon double bond (i.e., a vinyl polymerizable functional group) present in its molecular structure, where, under free radical polymerization, the carbon-carbon double bond in the vinyl polymerizable functional group is less reactive than the carbon-carbon double bond present in an acrylate or a methacrylate polymerizable functional group. In other words, although a carbon-carbon double bond is present in acrylate groups and methacrylate groups, as understood herein, monomers comprising a single acrylate or methacrylate polymerizable group are not considered to be vinyl-containing monomers. Examples of polymerizable groups having carbon-carbon double bonds which are less reactive than the carbon-carbon double bonds of acrylate or methacrylate polymerizable groups include vinyl amide, vinyl ester, and allyl ester polymerizable groups. Thus, as used herein, examples of vinyl-containing monomers include monomers having a single vinyl amide, a single vinyl ester, or a single allyl ester polymerizable group.

When the hydrophilic monomer comprises a monomer component comprising a first hydrophilic monomer and a second hydrophilic monomer. In one example, neither the first hydrophilic monomer nor the second hydrophilic monomer is a vinyl ether-containing monomer. In another example, the first hydrophilic monomer can have a different polymerizable functional group than the second hydrophilic monomer. For example, when the first hydrophilic monomer or monomer component comprises or consists of an amide-containing monomer, the second hydrophilic monomer can comprise or consist of a non-amide monomer (i.e., a monomer not having an amide functional group as part of its molecular structure). As another example, when the first hydrophilic monomer comprises or consists of a vinyl-containing monomer, the second hydrophilic monomer can comprise or consist of a non-vinyl monomer (i.e., a monomer not having a vinyl polymerizable functional group as part of its molecular structure). In another example, when the first hydrophilic monomer comprises or consists of an amide monomer having an N-vinyl group, the second hydrophilic monomer can comprise or consist of a non-amide monomer. When the first hydrophilic monomer comprises or consists of a non-acrylate monomer (i.e., a monomer not having an acrylate or methacrylate polymerizable functional group as part of its molecular structure), the second hydrophilic monomer can comprise or consist of an acrylate-containing monomer, or a methacrylate-containing monomer.

In any or each of the foregoing examples, as previously discussed, the amount of the hydrophilic monomer or monomer component (e.g., the one or more hydrophilic monomers present in the polymerizable composition) can be from 30 to 60 unit parts of the polymerizable composition. In one example, the hydrophilic monomer or mixture of monomers component can constitute from 40 to 55 unit parts of the polymerizable composition, or from 45 to 50 unit parts of the composition. When VMA is present in the polymerizable composition, it can be present in an amount from 30 unit parts to 60 unit parts. In one example, VMA is present in the polymerizable composition in an amount from about 40 unit parts to about 55 unit parts, or from 45 to 50 unit parts. If the hydrophilic monomers, N,N-dimethylacrylamide (DMA), 2-hydroxyethyl methacrylate (HEMA), or 2-hydroxylbutyl methacrylate (HOB), are present in the polymerizable composition as an optional second hydrophilic monomer or mixture of monomers, they can be present in amounts from about 3 to about 10 unit parts.

The polymerizable composition of the present disclosure further comprises at least one crosslinking agent. The at least one crosslinking agent can be present as single crosslinking agent, or can comprise a crosslinking agent component composed of two or more crosslinking agents. In accordance with the present disclosure, a crosslinking agent is understood to be a monomer having more than one polymerizable functional group as part of its molecular structure, such as two or three or four polymerizable functional groups, i.e., a multifunctional monomer such as a bifunctional or trifunctional or tetrafunctional monomer.

Non-silicon containing crosslinking agents that can be used in the polymerizable compositions disclosed herein include, for example, without limitation, allyl(meth)acrylate, or lower alkylene glycol di(meth)acrylate, or poly(lower alkylene) glycol di(meth)acrylate, or lower alkylene di(meth)acrylate, or divinyl ether, or divinyl sulfone, or di- and trivinylbenzene, or trimethylolpropane tri(meth)acrylate, or pentaerythritol tetra(meth)acrylate, or bisphenol A di(meth)acrylate, or methylenebis(meth)acrylamide, or triallyl phthalate and diallyl phthalate, or any combination thereof. The crosslinking agent can consist or comprise, for example, ethylene glycol dimethacrylate (EGDMA), or triethylene glycol dimethacrylate (TEGDMA), or triethylene glycol divinyl ether (TEGDVE), or any combination thereof. In one example, the crosslinking agent can have a molecular weight less than 1500 daltons, or less than 1000 daltons, or less than 500 daltons, or less than 200 daltons.

In one example, the crosslinking agent can comprise or consist of a vinyl-containing cross-linking agent. As used herein, a vinyl-containing cross-linking agent is a monomer having at least two polymerizable carbon-carbon double bonds (i.e., at least two vinyl polymerizable functional groups) present in its molecular structure, where each of the at least two polymerizable carbon-carbon double bonds present in the vinyl polymerizable functional groups of the vinyl-containing cross-linking agent is less reactive than a carbon-carbon double bond present in an acrylate or methacrylate polymerizable functional group. Although carbon-carbon double bonds are present in acrylate and methacrylate polymerizable functional groups, as understood herein, crosslinking agents comprising one or more acrylate or methacrylate polymerizable group (e.g., an acrylate-containing cross-linking agent or a methacrylate-containing cross-linking agent) are not considered to be vinyl-containing crosslinking agents. Polymerizable functional groups having carbon-carbon double bonds which are less reactive than the carbon-carbon double bonds of acrylate or methacrylate polymerizable groups include, for example, vinyl amide, vinyl ester, vinyl ether and allyl ester polymerizable functional groups. Thus, as used herein, vinyl-containing crosslinking agents include, for example, crosslinking agents having at least two polymerizable functional groups selected from a vinyl amide, a vinyl ether, a vinyl ester, an allyl ester, and any combination thereof. As used herein, a mixed vinyl-containing crosslinking agent is a crosslinking agent having at least one polymerizable carbon-carbon double bond (i.e., at least one vinyl polymerizable functional group) present in its structure which is less reactive than the carbon-carbon double bond present in an acrylate or methacrylate polymerizable functional group, and at least one polymerizable functional group present in its structure having a carbon-carbon double bond which is at least as reactive as the carbon-carbon double bond in an acrylate or methacrylate polymerizable functional group.

When present in the polymerizable composition, the vinyl-containing crosslinking agent or crosslinking agent component can be present in an amount from about 0.01 unit parts to from about 2.0 unit parts, or from about 0.01 unit parts to about 0.80 unit parts, or from about 0.01 unit parts to about 0.30 unit parts, or from about 0.05 unit parts to about 0.20 unit parts, or in an amount of about 0.1 unit parts.

In one example, the crosslinking agent can comprise or consist of a non-vinyl-containing crosslinking agent, i.e., a cross-linking agent which is not a vinyl-containing crosslinking agent. For example, the non-vinyl-containing crosslinking agent can comprise or consist of an acrylate-containing cross-linking agent (i.e., a cross-linking agent having at least two acrylate polymerizable functional groups), or a methacrylate-containing crosslinking agent (i.e., at least two methacrylate polymerizable functional groups), or at least one acrylate-containing crosslinking agent and at least one methacrylate-containing crosslinking agent. The non-vinyl crosslinking agent can be present in an amount from about 0.01 unit parts to about 5 unit parts, or from about 0.1 unit parts to about 4 unit parts, or from about 0.3 unit parts to about 3.0 unit parts, or from about 0.2 unit parts to about 2.0 unit parts.

When the at least one cross-linking agent is present as a crosslinking agent component, in one example, the crosslinking agent component can comprise or consist of a combination of two or more crosslinking agents, each of which has a different polymerizable functional group. For example, the crosslinking agent component can comprise one vinyl-containing crosslinking agent, and one acrylate-containing crosslinking agent. The crosslinking agent component can comprise one vinyl-containing crosslinking agent and one methacrylate-containing crosslinking group. The crosslinking agent component can comprise or consist of one vinyl ether-containing crosslinking agent, and one methacrylate-containing crosslinking agent.

The total amount of crosslinking agents (i.e., the total unit parts of all crosslinking agents present in the polymerizable composition) can be an amount from about 0.01 unit parts to about 5 unit parts, or from about 0.1 unit parts to about 4 unit parts, or from about 0.3 unit parts to about 3.0 unit parts, or from about 0.2 unit parts to about 2.0 unit parts, or from about 0.6 to about 1.5 unit parts.

In one example, when the present polymerizable composition comprises at least one vinyl-containing crosslinking agent, the total amount of vinyl-containing crosslinking agents present in the polymerizable composition can be an amount from about 0.01 unit parts to from about 2.0 unit parts, or from about 0.01 unit parts to about 0.80 unit parts, or from about 0.01 unit parts to about 0.30 unit parts, or from about 0.05 unit parts to about 0.20 unit parts, or in an amount of about 0.1 unit parts.

When the polymerizable composition comprises a first siloxane monomer and at least one crosslinking agent, the first siloxane monomer (e.g., a first siloxane monomer present as the only siloxane monomer of the polymerizable composition, or present as a first siloxane monomer present as part of a siloxane monomer component comprised of two or more siloxane monomers) and the at least one crosslinking agent (i.e., a single crosslinking agent or a cross-linking agent component composed of two or more crosslinking agents) can be present in the polymerizable composition in a ratio of at least 10:1 based on the total unit parts by weight of the first siloxane monomer to the total unit parts by weight of the at least one crosslinking agent (i.e., the sum of the unit parts of all vinyl-containing crosslinking agents present in the polymerizable composition). For example, the ratio can be at least 25:1 or at least 50:1 or at least 100:1 based on unit parts by weight.

In one example, the at least one crosslinking agent can comprise at least one vinyl-containing crosslinking agent, and at least one methacrylate-containing crosslinking agent. In another example, the at least one crosslinking agent can consist of only one or more vinyl-containing crosslinking agents. In another example, the at least one crosslinking agent can comprise or consist of at least one vinyl ether-containing crosslinking agent. In yet another example, the at least one crosslinking agent can consist of only one or more vinyl-containing crosslinking agents. In one particular example, the at least one crosslinking agent can comprise or consist of at least one vinyl ether-containing crosslinking agent.

When the at least one crosslinking agent comprises or consists of at least one vinyl-containing crosslinking agent (i.e., a single vinyl-containing crosslinking agent or a vinyl-containing crosslinking agent component composed of two or more vinyl-containing crosslinking agents), the first siloxane monomer and the at least one vinyl-containing crosslinking agent can be present in the polymerizable composition in a ratio of at least about 50:1 based on a ratio of a total number of unit parts of the first siloxane monomer to a total number of unit parts of the least one vinyl-containing crosslinking agent (i.e., the sum of the unit parts of all vinyl-containing crosslinking agents present in the polymerizable composition). For example, the ratio can be from about 50:1 to about 500:1, or from about 100:1 to about 400:1, or from about 200:1 to about 300:1 based on unit parts by weight.

The polymerizable composition of the present disclosure can further comprise at least one hydrophobic monomer. The hydrophobic monomer is understood to be a non-silicone containing polymerizable ingredient having only one polymerizable functional group present in its molecular structure. The at least one hydrophobic monomer can be present as a single hydrophobic monomer, or can be present as a hydrophobic monomer component comprising two or more hydrophobic monomers. Examples of hydrophobic monomers that can be used in the polymerizable compositions disclosed herein, include, without limitation, acrylate-containing hydrophobic monomers, or methacrylate-containing hydrophobic monomers, or any combination thereof. Examples of hydrophobic monomers include, without limitation, methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propyl methacrylate, or butyl acrylate, or vinyl acetate, or vinyl propionate, or vinyl butyrate, or vinyl valerate, or styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate, or trifluoroethyl methacrylate, or hexafluoroisopropyl methacrylate, or hexafluorobutyl methacrylate, or any combination thereof. In one particular example, the hydrophobic monomer can comprise or consist of MMA. When present in the polymerizable composition, the hydrophobic monomer can be present in an amount from about 5 to about 25 unit parts, or from about 10 to about 20 unit parts.

In one example of a polymerizable composition in accordance with the present disclosure, the at least one hydrophobic monomer can comprise or consist of at least one hydrophilic ethylene glycol methyl ether methacrylate-containing monomer. The hydrophobic ethylene glycol methyl ether methacrylate-containing monomer can be a hydrophobic ethylene glycol methyl ether methacrylate-containing monomer which is less hydrophobic than methyl methacrylate (MMA). The hydrophobic ethylene glycol methyl ether methacrylate-containing monomer can comprise or consist of ethylene glycol methyl ether methacrylate (EGMA), or di(ethylene glycol) methyl ether methacrylate, or tri(ethylene glycol) methyl ether methacrylate, or a poly(ethylene glycol) methyl ether methacrylate having from 4 to 10 ethylene glycol units, or a poly(ethylene glycol) methyl ether methacrylate having more than 10 ethylene glycol units, or any combination thereof. The hydrophobic ethylene glycol methyl ether methacrylate-containing monomer can comprise or consist of ethylene glycol methyl ether methacrylate (EGMA). The hydrophobic ethylene glycol methyl ether methacrylate-containing monomer can be present in the polymerizable composition in an amount from about 1 to about 20 unit parts by weight.

Optionally, the polymerizable composition can comprise at least one hydrophobic ethylene glycol methyl ether methacrylate-containing monomer, and at least one hydrophobic monomer which is not an ethylene glycol methyl ether methacrylate-containing monomer. For example, the at least one hydrophobic ethylene glycol methyl ether methacrylate-containing monomer can comprise or consist of EGMA, and the at least one hydrophobic monomer which is not an ethylene glycol methyl ether methacrylate-containing monomer can comprise or consist of MMA. The ratio of the unit parts of the at least one hydrophobic monomer which is not an ethylene glycol methyl ether methacrylate-containing monomer to the unit parts of the at least one hydrophobic ethylene glycol methyl ether methacrylate-containing monomer present in the polymerizable composition can be from about 6:1 to about 1:1, or can be about 2:1.

Additionally, the polymerizable composition can optionally include at least one initiator, or at least one organic diluent, or at least one surfactant, or at least one oxygen scavenger, or at least one tinting agent, or at least one UV absorber, or at least one chain transfer agent, or any combination thereof. The optional at least one initiator, at least one organic diluent, at least one surfactant, at least one oxygen scavenger, at least one tinting agent, at least one UV absorber, or at least one chain transfer agent are understood to be non-silicon ingredients, and can be either non-polymerizable ingredients or polymerizable ingredients (i.e., ingredients having a polymerizable functional group as part of their molecular structure).

The polymerizable compositions disclosed herein can optionally comprise one or more organic diluents, i.e., the polymerizable composition can comprise an organic diluent, or can comprise an organic diluent component comprising two or more organic diluents. Organic diluents that can optionally be included in the present polymerizable compositions include alcohols, including lower alcohols, such as, for example, without limitation, pentanol, or hexanol, or octanol, or decanol, or any combination thereof. When included, the organic diluent or organic diluent component can be provided in the polymerizable composition in an amount from about 1 to about 70 unit parts, or from about 2 unit parts to about 50 unit parts, or from about 5 unit parts to about 30 unit parts. Alternatively, the polymerizable compositions of the present disclosure can be diluent-free in that they do not contain any organic diluent to achieve miscibility between the siloxanes and the other lens forming ingredients, such as the optional hydrophilic monomers, hydrophobic monomer, and cross-linking agents. In addition, many of the present polymerizable compositions are essentially free of water (e.g., contain no more than 3.0% or 2.0% water by weight).

The present polymerizable compositions can optionally comprise one or more polymerization initiators, i.e., the polymerizable composition can comprise an initiator, or can comprise an initiator component comprising two or more polymerization initiators. Polymerization initiators that can be included in the present polymerizable compositions include, for example, azo compounds, or organic peroxides, or both. Initiators that can be present in the polymerizable composition include, for example, without limitation, benzoin ethyl ether, or benzyl dimethyl ketal, or alpha, alpha-diethoxyacetophenone, or 2,4,6-trimethylbenzoyl diphenyl phosphine oxide, or benzoin peroxide, or t-butyl peroxide, or azobisisobutyronitorile, or azobisdimethylvaleronitorile, or any combination thereof. UV photoinitiators can include, for example, phosphine oxides such as diphenyl (2,4,6-trimethyl benzoyl)phosphine oxide, or benzoin methyl ether, or 1-hydroxycyclohexylphenyl ketone, or Darocur (available from BASF, Florham Park, N.J., USA), or Irgacur (also available from BASF), or any combination thereof. In many of Examples 1-28 disclosed herein, the polymerization initiator is the thermal initiator 2,2'-azobis-2-methyl propanenitrile (VAZO-64 from E.I. DuPont de Nemours & Co., Wilmington, Del., USA). Other commonly used thermoinitiators can include 2,2'-azobis(2,4-dimethylpentanenitrile) (VAZO-52) and 1,1'-azo bis(cyanocyclohexane) (VAZO-88). The polymerization initiator or initiator component can be present in the polymerizable composition in an amount from about 0.01 unit parts to about 2.0 unit parts, or in an amount from about 0.1 unit parts to about 1.0 unit parts, or from about 0.2 unit parts to about 0.6 unit parts by weight.

Optionally, the present polymerizable compositions can comprise one or more UV absorbing agents, i.e., the polymerizable composition can comprise an UV absorbing agent, or can comprise an UV absorbing agent component comprising two or more UV absorbing agents. UV absorbing agents that can be included in the present polymerizable compositions include, for example, benzophenones, or benzotriazoles, or any combination thereof. In many of Examples 1-28 disclosed herein, the UV absorbing agent is 2-(3-(2H-benzotriazol-2-YL)-4-hydroxy-phenyl)ethyl methacrylate (NOR-BLOC® 7966 from Noramco, Athens, Ga., USA). The UV absorbing agent can also be 2-(4-Benzoyl-3-hydroxyphenoxy)ethyl acrylate (UV-416). The UV absorbing agent or UV absorbing agent component can be present in the polymerizable composition in an amount from about 0.01 unit parts to about 5.0 unit parts, or in an amount from about 0.1 unit parts to about 3.0 unit parts, or from about 0.2 unit parts to about 2.0 unit parts by weight.

The polymerizable compositions of the present disclosure can also optionally include at least one tinting agent (i.e., one tinting agent or a tinting agent component comprising two or more tinting agents), although both tinted and clear lens products are contemplated. In one example, the tinting agent can be a reactive dye or pigment effective to provide color to the resulting lens product. The tinting agent or tinting agent component of the polymerizable composition can comprise a polymerizable tinting agent, or can comprise a non-polymerizable tinting agent, or any combination thereof. The polymerizable tinting agent can be a tinting agent whose molecular structure comprises a polymerizable functional group, or can be a tinting agent whose molecular structure includes both a monomer portion and a dye portion, i.e., the tinting agent can be a monomer-dye compound. The molecular structure of the tinting agent can comprise a beta sulfone functional group, or can comprise a triazine functional group. Tinting agents can include, for example, VAT Blue 6 (7,16-Dichloro-6,15-dihydroanthrazine-5,9,14,18-tetrone), or 1-Amino-4-[3-(beta-sulfatoethylsulfonyl)anilio]-2-anthraquinonesulfonic acid (C. I. Reactive Blue 19, RB-19), or a monomer-dye compound of Reactive Blue 19 and hydroxyethylmethacrylate (RB-19 HEMA), or 1,4-bis[4[(2-methacryl-oxyethyl)phenylamino]anthraquinone (Reactive Blue 246, RB-246, available from Arran Chemical Company, Athlone, Ireland), or 1,4-Bis[(2-hydroxyethyl)amino]-9,10-anthracenedione bis(2-propenoic)ester (RB-247), or Reactive Blue 4, RB-4, or a monomer-dye compound of Reactive Blue 4 and hydroxyethyl methacrylate (RB-4 HEMA or "Blue HEMA"), or any combination thereof. In one example, the tinting agent or tinting agent component can comprise a polymerizable tinting agent. The polymerizable tinting agent component can comprise, for example, RB-246, or RB-247, or RB-4 HEMA, or RB-19 HEMA, or any combination thereof. Examples of monomer-dye compounds include RB-4 HEMA and RB-19 HEMA. Additional examples of monomer-dye compounds are described in U.S. Pat. No. 5,944,853 and U.S. Pat. No. 7,216,975, both of which are incorporated in their entirety by reference herein. Other exemplary tinting agents are disclosed, for example, in U.S. Patent Application Publication No. 2008/0048350, the disclosure of which is incorporated in its entirety herein by reference. In many of Examples 1-28 disclosed herein, the tinting agent is a reactive blue dye, such as those described in US4997897, the disclosure of which is incorporated in its entirety herein by reference. Other suitable tinting agents for use in accordance with the present invention are phthalocyanine pigments such as phthalocyanine blue, or phthalocyanine green, or chromic-alumina-cobaltous oxide, or chromium oxides, or various iron oxides for red, yellow, brown and black colors, or any combination thereof. Opaquing agents such as titanium dioxide can also be incorporated. For certain applications, a combination of tinting agents having different colors can be employed as the tinting agent component. If employed, the tinting agent or tinting agent component can be present in the polymerizable composition in an amount ranging from about 0.001 unit parts to about 15.0 unit parts, or about 0.005 unit parts to about 10.0 unit parts, or about 0.01 unit parts to about 8.0 unit parts.

The polymerizable compositions of the present disclosure can optionally comprise at least one oxygen scavenger, i.e., one oxygen scavenger or an oxygen scavenger component comprising two or more oxygen scavengers. Examples of oxygen scavengers which can be included as the oxygen scavenger or oxygen scavenger component of the present polymerizable compositions include, for example, Vitamin E, or phenolic compounds, or phosphite compounds, or phosphine compounds, or amine oxide compounds, or any combination thereof. For example, the oxygen scavenger or oxygen scavenger component can consist of or comprise a phosphine-containing compound. In many of Examples 1-28 disclosed herein, the oxygen scavenger or oxygen scavenger component is a phosphine-containing compound, such as triphenyl phosphine, or a polymerizable form of triphenyl phosphine, such as diphenyl(P-vinylphenyl)phosphine.

Chain transfer is a polymerization reaction in which the activity of a growing polymer chain is transferred to another molecule, reducing the average molecular weight of the final polymer. The polymerizable compositions of the present disclosure can optionally comprise at least one chain transfer agent, i.e., can comprise one chain transfer agent or can comprise a chain transfer agent component comprising at least two chain transfer agents. Examples of chain transfer agents which can be included as the chain transfer agent or the chain transfer component of the present polymerizable compositions include, for example, thiol compounds, or halocarbon compounds, or C3-C5 hydrocarbons, or any combination thereof. In many of Examples 1-28 disclosed herein, the chain transfer agent is allyloxy ethanol. When present in the polymerizable composition, the chain transfer agent or chain transfer agent component can be present in an amount from about 0.01 unit parts to about 1.5 unit parts, for example from about 0.1 unit parts to about 0.5 unit parts.

The polymerizable compositions of the present invention can optionally comprise at least one polymerizable form of a boron-containing compound such as, for example, a boronic acid, or boronic ester, or boronic anhydride, or any combination thereof. The polymerizable form of a boron-containing compound can comprise a form of vinylphenyl boronic acid including 2-vinylphenyl boronic acid, or 3-vinylphenyl boronic acid, or 4-vinylphenyl boronic acid, or 4-vinylphenyl boronic MIDA ester, or (meth)acrylamide phenyl boronic acid, or 2-(methacryloamide)phenyl boronic pinacol ester, or 3-acrylamidophenylboronic acid, or any combination thereof. The polymerizable form of the boron-containing compound can be present in the polymerizable composition in an amount from about 0.01% (wt/wt) to about 10% (wt/wt), or from about 0.05% (wt/wt) to about 5% (wt/wt), or from about 0.1% (wt/wt) to about 0.5% (wt/wt) or from about 0.1% (wt/wt) to about 0.3% (wt/wt). Examples of polymerizable compositions comprising boron-containing compounds are found in PCT Application No. PCT/US10/049,596 and PCT/US10/049,601, both of which are hereby incorporated by reference.

When the polymerizable form of the boron-containing compound is present in the polymerizable composition, following polymerization of the composition, the resulting polymer will comprise units of the boron-containing compound. In one example, the units of the boron-containing compound present in the polymeric lens body can be capable of complexing with a polyol, such as, for example, a 1, 2 polyol or a 1, 3 polyol, including 1, 2 diols or 1, 3 diols.

In one example, the polymerizable boron-containing compound present in the polymerizable composition can complex with the at least one vinyl alcohol copolymer of the at least one molding surface or mold member used to cast mold the polymerizable composition. In another example, the polymerized units of the boron-containing compound present in the polymeric device body can complex with the at least one vinyl alcohol copolymer of the at least one molding surface or mold member used to form a surface of the device body.

In one example, the wettability of the ophthalmic device body can be increased as a result of the complexation between the mold member and the polymerizable composition and/or polymeric device body. For example, the contact angle of a surface of the resulting ophthalmic device body which was cast molded in direct contact with a molding surface comprising the at least one vinyl alcohol copolymer which is not EVOH can lower (e.g., at least 5 degrees lower, or at least 10 degrees lower, or at least 15 degrees lower) than a surface of a device body formed from the same polymerizable composition comprising a boron-containing compound but which was molded in direct contact only with polypropylene, or in direct contact only with EVOH.

In another example, following demolding and delensing of the device body formed using a polymerizable composition comprising a boron-containing compound from at least one molding surface or molding layer comprising at least one vinyl alcohol copolymer which is not EVOH, a layer of the vinyl alcohol copolymer can be present on at least the surface of the device cast molded in direct contact with the vinyl alcohol copolymer. In one example, the demolding and/or delensing process can comprise a wet demolding and/or delensing process, and the coating of the vinyl alcohol copolymer can be present on all of the device surfaces, and can comprise solubilized vinyl alcohol copolymer which was complexed with the surfaces during the wet demolding and/or delensing process. In another example, the demolding and delensing processes can both comprise dry processes, the vinyl alcohol copolymer can be present only on the device surfaces cast molded in direct contact with the vinyl alcohol copolymer (i.e., the complexation and coating process occurred when the polymerizable composition was cured in contact with the solid vinyl alcohol copolymer molding surface or mold member, and not as a result of contact with a solution of the vinyl alcohol copolymer).

As used herein, a molecular weight is understood to refer to the number average molecular weight. The number average molecular weight is the ordinary arithmetic mean or average of the molecular weights of the individual molecules present in the sample of a monomer. As the individual molecules in a sample of monomer may vary slightly from one another in molar mass, some level of polydispersity may be present in the sample. As used herein, when the siloxane monomer, or any other monomer, macromer, pre-polymer, or polymer, of the polymerizable composition is polydisperse, the term "molecular weight" refers to the number average molecular weight of the monomer or ingredient. As one example, a sample of the siloxane monomer can have a number average molecular weight of about 15,000 daltons, but if the sample is polydisperse, the actual molecular weights of the individual monomers present in the sample may range from 12,000 daltons to 18,000 daltons.

The number average molecular weight can be the absolute number average molecular weight as determined by proton nuclear magnetic resonance (NMR) end group analysis, as understood by persons of ordinary skill in the art. Molecular weights may also be determined using gel permeation chromatography, as understood by persons of ordinary skill in the art, or may be provided by suppliers of the chemicals.

As used herein, unit parts is understood to mean unit parts by weight. For example, to prepare a formulation described as comprising x unit parts of a siloxane monomer and y unit parts of a hydrophilic monomer, the composition can be prepared by combining x grams of the siloxane monomer with y grams of the hydrophilic monomer to obtain a total of y+z grams of polymerizable composition, or by combining z ounces of the siloxane with y ounces of the hydrophilic monomer to obtain a total of y+z ounces of polymerizable composition, and so on. When the composition further comprises additional optional ingredients such as, for example, x unit parts of a cross-linking agent, x grams of the cross-linking agent are combined with z grams of the siloxane monomer and y grams of the hydrophilic monomer to obtain a total of x+y+z grams of polymerizable composition, and so on. When the composition comprises an additional optional ingredient comprising an ingredient component composed of two ingredients, such as, for example, a hydrophobic monomer component consisting of a first hydrophobic monomer and a second hydrophobic monomer, in addition to the z unit parts of siloxane monomer, the y unit parts of hydrophilic monomer and the x unit parts of the cross-linker, w unit parts of the first hydrophobic monomer and v unit parts of the second hydrophobic monomer are combined to obtain a total amount of v+w+x+y+z unit parts of the polymerizable composition. It is understood that the unit parts of the at least one hydrophobic monomer present in such a polymerizable is the sum of the unit parts of the first hydrophobic monomer and the unit parts of the second hydrophobic monomer, e.g., v+w unit parts in this example. Typically, a formula for a polymerizable composition will be composed of ingredients in amounts totaling from about 90 to about 110 unit parts by weight. When amounts of components of the polymerizable composition are recited herein as being in unit parts, it is to be understood that the unit parts of these component are based on a formula providing a total weight of the composition ranging from about 90 to 110 unit parts. In one example, the unit parts by weight can be based on a formula providing a total weight of the composition ranging from about 95 to 105 unit parts by weight, or from about 98 to 102 unit parts by weight.

In accordance with the present disclosure, the combination of the polymeric component and the liquid component present as a hydrated silicone hydrogel ophthalmic device can be suitable for placement on an eye of a person. The hydrated device body can have a generally convex anterior surface and a generally concave posterior surface, and can have an equilibrium water content (EWC) greater than 10% weight by weight (wt/wt). Thus, in one example, the ophthalmic device of the present disclosure can be a soft silicone hydrogel contact lens, which as used herein, refers to a contact lens which, when fully hydrated, can be folded upon itself without breaking.

As understood in the industry, a daily disposable contact lens is an unworn contact lens that is removed from its sealed, sterilized package (primary package) produced by a contact lens manufacturer, placed on a person's eye, and is removed and discarded after the person is done wearing the lens at the end of the day. Typically, the duration of lens wear for daily disposable contact lenses is from eight to fourteen hours, and they are then disposed of after wear. Daily disposable lenses are not cleaned or exposed to cleaning solutions prior to placement in the eye since they are sterile prior to opening the package. A daily disposable silicone hydrogel contact lens is a disposable silicone hydrogel contact lens that is replaced daily. In contrast, non-daily disposable contact lenses are disposable contact lenses that are replaced less frequently than daily (e.g., weekly, bi-weekly, or monthly). Non-daily disposable contact lenses are either removed from the eye and cleaned with a cleaning solution on a regular basis, or are worn continuously without removal from the eye. The present contact lenses can be either daily disposable contact lenses or non-daily disposable contact lenses. The present disclosure relates to polymerizable compositions comprising at least one siloxane monomer, and at least one hydrophobic ethylene glycol methyl ether methacrylate-containing monomer, or at least one hydrophilic vinyl ether-containing monomer, or both; polymeric lens bodies that are the reaction products of these polymerizable compositions; silicone hydrogel contact lenses comprising these polymeric lens bodies in hydrated form; packages comprising these silicone hydrogel contact lenses and a packaging solution in a sealed package; and methods of manufacturing these silicone hydrogel contact lenses.

In one example of the present disclosure, the silicone hydrogel ophthalmic devices, including silicone hydrogel contact lenses, formed from the polymerizable compositions disclosed herein can have ophthalmically acceptably wettable lens surfaces. The silicone hydrogel ophthalmic devices can have ophthalmically acceptably wettable device surfaces when the device surfaces are free of a plasma treatment. The silicone hydrogel ophthalmic devices can have ophthalmically acceptably wettable surfaces when the polymerizable composition used to form the devices is free of a wetting agent, such as, for example, a polymeric wetting agent.

As previously discussed, the polymerizable composition of the present disclosure is polymerized in direct contact with at least one mold member formed of a material comprising at least one vinyl alcohol copolymer which is not an ethylene-vinyl alcohol copolymer. In one example, the vinyl alcohol copolymer which is not an ethylene-vinyl alcohol copolymer can be a vinyl alcohol copolymer containing a large number of amorphous regions and thus few crystalline regions, i.e., few regions of three-dimensional ordering on atomic length scales. In polymers, crystalline regions can arise from intramolecular folding of the polymer, from stacking of adjacent polymer chains, or from both. Polymers can contain both crystalline and amorphous regions. Degree of crystallinity is commonly used to describe the crystalline content of a given polymer, with a degree of crystallinity of 0 indicating a completely non-crystalline (amorphous) polymer and a degree of crystallinity of 1 indicating a completely crystalline polymer. Crystalline content can also be expressed as a percentage, with an average level of crystallinity of 0% indicating a completely non-crystalline (amorphous) polymer and an average level of crystallinity of 100% indicating a completely crystalline polymer. The degree or level of crystallinity can be determined using differential scanning calorimetry (DSC). For example, the degree or level of crystallinity can be determined using DSC by heating a sample of the copolymer at a heating rate of 10° C./minute from 0° C. to 250° C., and determining the degree or level of crystallinity based on the first cooling and heating cycle conducted on the same. The vinyl alcohol copolymer can be a vinyl alcohol copolymer with an average level of crystallinity from about 0% to about 35%, including, for example, a vinyl alcohol copolymer with an average level of crystallinity less than or equal to 35%, or less than or equal to 30%, or less than or equal to 25%, or less than or equal to 20%, or less than or equal to 15%, or less than or equal to 10%, or from about 5% to about 35%, or from about 10% to about 35%, or from about 15% to about 30%, or from about 17% to about 25%.

The vinyl alcohol copolymer can comprise vinyl alcohol units having a 1, 2 diol structure.

The vinyl alcohol units having a 1, 2 diol structure of the vinyl alcohol copolymer can comprise or consist of vinyl alcohol units having a 1, 2 diol structure represented by structure (8):

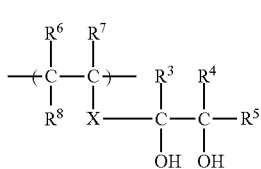

(8)

wherein each of $R^3$, $R^4$, $R^5$, $R^6$, $R^7$, and $R^8$ of structure (8) independently is a hydrogen atom or an organic group, and X of structure (8) is a single bond or a bonding chain.

On a molecular structure basis, a total content of vinyl alcohol units of structure (8) present in a molecule of the vinyl alcohol copolymer can be from about 0.1% to about 30%. In another example, from about 0.3% to about 20%, or from about 0.5% to 25%, or from about 3% to about 16%, or from about 0.5% to about 15%, or from about 0.1% to about 10%, or from 0.1% to about 1.5%, or from about 0.4% to about 1.2% of the total number of units present in a molecule of the polymer can comprise vinyl alcohol units of structure (8).

The vinyl alcohol units having a 1, 2 diol structure can comprise or consist of vinyl alcohol units having a 1, 2 diol structure represented by structure (9):

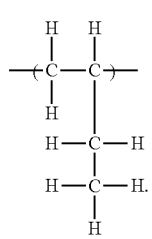

(9)

On a molecular structure basis, a total content of vinyl alcohol units of structure (9) present in a molecule of the vinyl alcohol copolymer can be from about 0.1% to about 30%. In another example, from about 0.3% to about 20%, or from about 0.5% to 25%, or from about 3% to about 16%, or from about 0.5% to about 15%, or from about 0.1% to about 10%, or from 0.1% to about 1.5%, or from about 0.4% to about 1.2% of the total number of units present in a molecule of the polymer can comprise vinyl alcohol units of structure (9).

The vinyl alcohol copolymer can comprise units of a diacetyloxy group. For example, the vinyl alcohol copolymer can comprise units of 3,4-diacetyloxy-1-butene.

The vinyl alcohol copolymer can be fully or partially saponified. (i.e., all or at least one ester group present in the polymer has been reacted, for example, heated with an alkali, to produce a free alcohol group). In other words, all of the ester groups present in the vinyl alcohol copolymer, for example, acetoacetic ester groups, may have been substituted with hydroxyl groups through saponification, or only a portion of the ester groups may have been substituted with hydroxyl groups through saponification. The vinyl alcohol copolymer can be saponified to a degree of at least 50 mol. %, or of at least 60 mol. %, or at least 70 mol. %, or at least 80 mol. %, or at least 90 mol. %.

In one example, the vinyl alcohol copolymer can comprise or consist of an acetoacetic ester group-containing vinyl alcohol copolymer. The acetoacetic ester group-containing vinyl alcohol copolymer can comprise units of vinyl alcohol, and units of an acetoacetic ester group having a structure represented by structure (10):

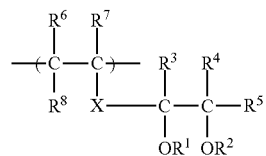

(10)

wherein each of $R^1$ and $R^2$ of structure (10) independently is a hydrogen atom or an acetoacetyl group and at least one of $R^1$ and $R^2$ is an acetoacetyl group, and each of $R^3$, $R^4$, $R^5$, $R^6$, $R^7$, and $R^8$ of structure (10) independently is a hydrogen atom or an organic group, and X of structure (10) is a single bond or a bonding chain. The organic group of structure (10) can be an alkyl group.

On a molecular structure basis, a total content of acetoacetic ester group units of structure (10) present in the acetoacetic ester group-containing vinyl alcohol copolymer can be from about 0.1% to about 30%. In other words, in every molecule of the copolymer, when the total number of units of different types of groups present in the molecule is 100%, from about 0.1% to about 30% of the total number of units present in the molecule can comprise units of structure (10). For example, if the copolymer molecule is formed of a total of 200 units of various types, from about 0.2 to about 60 of those units may comprise units of structure (10). In another example, from about 0.3% to about 20%, or from about 0.5% to 25%, or from about 3% to about 16%, or from about 0.5% to about 15%, or from about 0.1% to about 10%, or from 0.1% to about 1.5%, or from about 0.4% to about 1.2% of the total number of units present in a molecule of the copolymer can comprise units of structure (10).

The vinyl alcohol units of the acetoacetic ester group-containing vinyl alcohol copolymer can comprise or consist of vinyl alcohol units having a 1, 2 diol structure. The vinyl alcohol units having a 1, 2 diol structure can comprise or consist of vinyl alcohol units having a 1, 2 diol structure represented by structure (8):

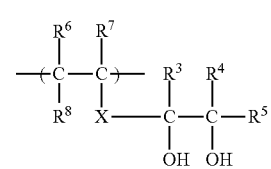

(8)

wherein each of $R^3$, $R^4$, $R^5$, $R^6$, $R^7$, and $R^8$ of structure (8) independently is a hydrogen atom or an organic group, and X of structure (8) is a single bond or a bonding chain.

On a molecular structure basis, a total content of vinyl alcohol units of structure (8) present in a molecule of the acetoacetic ester group-containing vinyl alcohol copolymer can be from about 0.1% to about 30%. In another example, from about 0.3% to about 20%, or from about 0.5% to 25%, or from about 3% to about 16%, or from about 0.5% to about 15%, or from about 0.1% to about 10%, or from 0.1% to about 1.5%, or from about 0.4% to about 1.2% of the total number of units present in a molecule of the copolymer can comprise vinyl alcohol units of structure (8).

The acetoacetic ester group-containing vinyl alcohol copolymer can comprise units having a structure represented by structure (11):

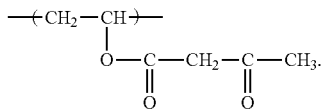

On a molecular structure basis, a total content of units of structure (11) present in a molecule of the acetoacetic ester group-containing vinyl alcohol copolymer can be from about 0.1% to about 30%. In another example, from about 0.3% to about 20%, or from about 0.5% to 25%, or from about 3% to about 16%, or from about 0.5% to about 15%, or from about 0.1% to about 10%, or from 0.1% to about 1.5%, or from about 0.4% to about 1.2% of the total number of units present in a molecule of the copolymer can comprise units of structure (11).

In another example, the vinyl alcohol copolymer can comprise or consist of a vinyl alcohol copolymer which has been partially acetalized (i.e., at least one oxygen atom double-bonded to a carbon atom present in the copolymer has been reacted, for example by an acid catalyzed reaction, to form an acetal or ketal group). The vinyl alcohol copolymer which has been partially acetalized can comprise vinyl alcohol units having a 1, 2 diol structure. The vinyl alcohol units having the 1, 2 diol structure can have a 1, 2 diol structure represented by structure (8):

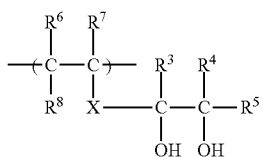

wherein each of $R^3$, $R^4$, $R^5$, $R^6$, $R^7$, and $R^8$ of structure (8) independently represents a hydrogen atom or an organic group, and X of structure (8) is a single bond or a bonding chain.

On a molecular structure basis, a total content of vinyl alcohol units of structure (8) present in a molecule of the vinyl alcohol copolymer which has been partially acetalized can be from about 0.1% to about 30%. In another example, from about 0.3% to about 20%, or from about 0.5% to 25%, or from about 3% to about 16%, or from about 0.5% to about 15%, or from about 0.1% to about 10%, or from 0.1% to about 1.5%, or from about 0.4% to about 1.2% of the total number of units present in a molecule of the copolymer can comprise vinyl alcohol units of structure (8).

The vinyl alcohol copolymer which has been partially acetalized can be fully or partially saponified. The vinyl alcohol copolymer which has been partially acetalized can be saponified to a degree of at least 50 mol. %, or of at least 60 mol. %, or at least 70 mol. %, or at least 80 mol. %, or at least 90 mol. %.

In one example, the vinyl alcohol copolymer can be a vinyl alcohol copolymer which is visibly soluble in water or an aqueous solution at room temperature (e.g., about 20-25 degrees C.). For example, the vinyl alcohol copolymer can be a polymer for which 50 grams or more of the copolymer are visibly fully soluble in 1 liter of deionized water at 20 degrees C. (i.e., the copolymer is soluble at a level of at least 5% wt/wt in water) as determined using a standard shake flask method as known to persons of ordinary skill in the art. In another example, the vinyl alcohol copolymer can be a copolymer for which 100 grams or more of the copolymer are visibly soluble in 1 liter of deionized water at 20 degrees C. In another example, the vinyl alcohol copolymer can be a copolymer for which 150 grams or more of the copolymer are visibly soluble in 1 liter of deionized water at 20 degrees C. In yet another example, the vinyl alcohol copolymer can be a copolymer for which 200 grams or more of the copolymer are visibly soluble in 1 liter of deionized water at 20 degrees C.

When formed into a dry film, the vinyl alcohol copolymer can have a low rate of oxygen transmittance. For example, the rate of oxygen transmittance through a dry film formed of the polymer can be less than 2.0 cc 20 μ/m² day atm, or less than 1.5 cc 20 μ/m² day atm, or less than 1.0 cc 20 μ/m² day atm, or less than 0.5 cc 20 μ/m² day atm, or less than 0.2 cc 20 μ/m² day atm as determined for a dry sample at 20 degrees C. In another example, the rate of oxygen transmittance can be less than 0.005 cc 20 μ/m² day, or less than 0.004 cc 20 μ/m² day, or less than 0.003 cc 20 μ/m² day. When a vinyl alcohol copolymer with a low rate of oxygen transmittance is used to form a mold member used to cast mold an ophthalmic device, due to the low level of oxygen transmittance of the mold member, it may be possible to cure the ophthalmic device in an oxygen-containing atmosphere without the presence of oxygen in the atmosphere disrupting the curing process. Thus, in one example, the methods of manufacturing of the present disclosure can be methods using mold members formed of the vinyl alcohol copolymer having low rates of oxygen transmission and can involve curing the polymerizable composition in the presence of an oxygen-containing or oxygen-rich atmosphere to form the polymeric ophthalmic device, although it is also possible to cure the polymerizable composition in the presence of a low oxygen or essentially oxygen-free atmosphere, such as, for example, an atmosphere rich in nitrogen gas or an inert gas.

The vinyl alcohol copolymer can be biodegradable. For example, the vinyl alcohol copolymer can have a level of biodegradability of at least 40%, or at least 50%, or at least 60%, after a standing time of about 30 days as determined using test method ISO 14851 with a sample of about 600 ml, about 300 ml of standard testing solution, and a temperature of about 25 degrees C.

The vinyl alcohol copolymer of the present disclosure can be relatively transparent to visible light. When the transparency of the solid, dry polymer is measured as percent haze, the percent haze of the polymer can be less than 30%, or less than 27%, or less than 24%, or less than 22%, or less than 20%, or less than 18%.

The vinyl alcohol copolymer of the present disclosure can have a relatively low level of UV light transmittance. The UV light transmittance through a mold member formed of the polymer can be less than 15% (i.e., more than 85% of the UV light is not transmitted). The UV light transmittance through the mold member can be less than 10%, or less than 5%, or less than 3%. When mold members formed of the polymer having low UV light transmittance are used in a curing process involving the use of UV light, the level of UV light transmitted into the device-forming cavity may need to be high, and thus a high level of incident UV light may need to be applied to the exterior of the mold member. For example, more than 500 μW, or more than 750 μW, or more than 1000 μW, or more than 1200 μW, or more than 1500 μW of UV light can be applied to the exterior of the mold member during the curing process. As many UV light bulbs are known to function best when operating at higher levels, providing such high incident light levels may allow the UV bulbs to operate more efficiently, increasing bulb life.

The vinyl alcohol copolymer can be a thermoplastic vinyl alcohol polymer, i.e., a vinyl alcohol copolymer that becomes liquid or malleable when heated and freezes to a glassy state when sufficiently cooled, and which can be repeatedly re-melted and re-molded.

The vinyl alcohol copolymer can be an extrudable vinyl alcohol copolymer, i.e., a vinyl alcohol copolymer that can be processed by pushing or drawing the polymer through a die for form an object of a desired shape.

The vinyl alcohol copolymer can be a vinyl alcohol copolymer suitable for injection molding, i.e., a vinyl alcohol copolymer that can be processed by heating the copolymer to a fluid state and injecting it into a mold to form an object of a desired shape. The vinyl alcohol copolymer suitable for injection molding can have a melting point below its decomposition temperature. For example, the melting point can be more than about 20° C., more than about 40° C., more than about 60° C., more than about 80° C., or more than about 100° C. below the decomposition temperature of the polymer. In one example, the decomposition temperature of the vinyl alcohol copolymer can be about 300° C.

In one example, the melting point of the vinyl alcohol copolymer can be from about 140° C. to about 190° C., from about 155° C. to about 180° C., from about 160° C. to about 172° C., or from about 150° C. to about 230° C. In another example, the glass transition temperature of the vinyl alcohol polymer can be from about 60° C. to about 85° C., from about 65° C. to about 80° C., or from about 70° C. to about 76° C.

In one particular example, the vinyl alcohol copolymer of the present disclosure can be NICHIGO G-POLYMER™ manufactured by Nippon Gohsei, Osaka, Japan.

The vinyl alcohol copolymer can comprise a vinyl alcohol copolymer with high vinyl alcohol content, or with low vinyl alcohol content, i.e., the majority of the units present in the vinyl alcohol copolymer can be units of a type of vinyl alcohol, or a minority of the units present in the vinyl alcohol copolymer can be units of a type of vinyl alcohol, respectively. The vinyl alcohol copolymer can be a vinyl alcohol copolymer having a vinyl alcohol unit content greater than or equal to about 95%, greater than or equal to about 90%, greater than or equal to about 85%, greater than or equal to about 80%, greater than or equal to about 75%, greater than or equal to about 70%, greater than or equal to about 65%, greater than or equal to about 60%, greater than or equal to about 55%, greater than or equal to about 50%, greater than or equal to about 45%, greater than or equal to about 40%, greater than or equal to about 35%, greater than or equal to about 30%, greater than or equal to about 25%, greater than or equal to about 20%, greater than or equal to about 15%, greater than or equal to about 10%, greater than or equal to about 5%, or less than or equal to about 5%. The percentage of vinyl alcohol units in the polymer chain can be expressed as on a weight percent basis, or a molar percent basis.

It has been discovered that ophthalmic device molds made of the vinyl alcohol copolymers described herein can be used to cast mold ophthalmic lens bodies. Ophthalmic devices can be demolded, delensed or both demolded and delensed from molds made partially or entirely of one or more vinyl alcohol copolymers using "wet" demolding, delensing or both demolding and delensing methods, i.e. methods involving the application of a liquid to the device body and the mold assembly or mold member or molding surface. Ophthalmic devices can also be demolded, delensed or both demolded and delensed using "dry" demolding, delensing, or both demolding and delensing methods, i.e., methods which do not involve application of a liquid to the device body and the mold assembly or mold member or molding surface. Unlike molds made of PVOH having low amorphous content, the molds made of vinyl alcohol copolymers can be formed by injection molding, or can be formed by compression molding, continuous compression molding, thermoforming, etc. Further, use of these molds made of at least one vinyl alcohol copolymer to mold silicone hydrogel ophthalmic devices can result in device bodies having surfaces that are ophthalmically acceptably wettable without application of a surface treatment to the device surfaces and without the presence of components in the polymerizable composition that form an interpenetrating network (IPN) of a polymeric wetting agent in the device body.

One or more of the vinyl alcohol copolymers disclosed herein can be used to form at least one molding surface, or mold member, or mold assembly used to cast mold an ophthalmic device. For example, a molding surface of a mold member can be formed by injection molding the vinyl alcohol copolymer, by machining the vinyl alcohol copolymer, or by both injection molding and machining the vinyl alcohol polymer. The machining can comprise lathing, or ablating, or both lathing and ablating the vinyl alcohol copolymer to form all or a portion of a molding surface.

The at least one mold surface, or mold member, or mold assembly formed of the vinyl alcohol copolymer disclosed herein can be a first mold member comprising a molding surface configured to mold an anterior surface of an ophthalmic device. The at least one mold member formed of the vinyl alcohol copolymer can be a second mold member comprising a molding surface configured to mold a posterior surface of an ophthalmic device. The at least one mold member formed of the vinyl alcohol copolymer can be both a first mold member comprising a molding surface configured to mold an anterior surface of an ophthalmic device, and a second mold member comprising a molding surface configured to mold a posterior surface of an ophthalmic device. The first mold member and the second mold member can be configured to form an ophthalmic device-shaped cavity therebetween when the first mold member and the second mold member are combined as a mold assembly.

As used herein, an ophthalmic device can comprise an ocular insert. An ocular insert is a polymeric device which is, during wear, placed in contact with the conjunctiva or with an anterior ocular surface, or the punctum, or any combination thereof. The anterior ocular surface contacted by the ocular insert during wear can comprise the cornea, or the sclera, or both. In one example, the ocular insert can comprise a punctual plug. An ocular insert may or may not be a transparent device, and may or may not include an optic zone providing vision correction. Optionally, the ocular insert can comprise a drug-delivery device, a diagnostic device, or both. When the ocular insert comprises a drug-delivery device, the drug delivery device can be configured to provide controlled release of a drug over a pre-determined period of time such as, for example, 2 hours, or 12 hours, or 24 hours, or one week, or one month, or more than one month.

The at least one molding surface, or mold member, or mold assembly formed of the vinyl alcohol copolymer disclosed herein can be a first mold member comprising a molding surface configured to mold an anterior surface of an ocular insert. The at least one mold member formed of the vinyl alcohol copolymer can be a second mold member comprising a molding surface configured to mold a posterior surface of an ocular insert. The at least one mold member formed of the vinyl alcohol copolymer can be both a first mold member comprising a molding surface configured to mold an anterior surface of an ocular insert, and a second mold member comprising a molding surface configured to mold a posterior surface of an ocular insert. The first mold member and the second mold member can be configured to form an ocular insert-shaped cavity therebetween when the first mold member and the second mold member are combined as a mold assembly.

As used herein, contact lenses are understood to be polymeric devices configured to be placed or disposed on a cornea of an animal or human eye. Generally, contact lenses comprise a convex anterior surface, and a concave posterior surface which may contact the cornea during wear. Contact lenses can be cosmetic lenses or vision correction lenses or both cosmetic and vision correction lenses. Vision correction lenses include a transparent vision correction optic zone. The vision-correction optic zone can be surrounded by a non-vision correction peripheral zone which may also be transparent or may include a region intended to mask, enhance or change eye color or appearance. Cosmetic lenses are lenses intended to mask, enhance or change eye color or appearance, and may or may not be transparent and may or may not include a vision correction optic zone.

The at least one molding surface, or mold member, or mold assembly formed of the vinyl alcohol copolymer disclosed herein can be a first mold member comprising a concave molding surface configured to mold an anterior surface of a contact lens. The at least one mold member formed of the vinyl alcohol copolymer can be a second mold member comprising a convex molding surface configured to mold a posterior surface of a contact lens. The at least one mold member formed of the vinyl alcohol copolymer can be both a first mold member comprising a concave molding surface configured to mold an anterior surface of a contact lens, and a second mold member comprising a convex molding surface configured to mold a posterior surface of a contact lens. The first mold member and the second mold member can be configured to form a contact lens-shaped cavity therebetween when the first mold member and the second mold member are combined as a mold assembly.

The process of cast molding contact lens bodies, including silicone hydrogel contact lens bodies, typically begins with the preparation of a pair of mold members (i.e., a first mold member and a second mold member). The mold members can be produced by injection molding a thermoplastic polymer mold material into mold shaped cavities, by lathing the polymer mold material to form the entire mold member, or by a combination of injection molding and lathing, for example, injection molding to form the basic shape of the mold member and then lathing all or part of the lens forming region of the mold member. For example, a first portion of the device-forming molding surface can comprise an injection molded lens-forming molding surface, and a second portion of the device-forming molding surface can comprise a machined device-forming molding surface. In one such example, the first portion of the lens-forming molding surface can comprise a portion of the lens-forming molding surface molding a peripheral zone and edge of a contact lens, and a second portion of the lens-forming molding surface can comprise a portion of the lens-forming molding surface molding an optic zone of a contact lens.

Typically, when cast molding ophthalmic devices having optical zones, two mold members are combined to form a mold assembly. The two mold members are sized and structured to be assembled together to define a device-shaped cavity therebetween. In the one example, for molding a contact lens, each of the two mold members can comprise either an optical quality concave lens forming molding surface used to mold an anterior surface of a lens, or a convex optical quality lens forming molding surface used to mold a posterior surface of a lens. For the purposes of this disclosure, the mold member with a concave molding surface is referred to as a first mold member or a female mold member, and the mold member with a convex molding surface is referred to as a second mold member or a male mold member. The first and second mold members can be structured to form a lens-shaped cavity therebetween when assembled with each other to form a mold assembly. Alternative mold member configurations, such as, for example, mold assemblies comprising more than two mold members or mold members that are shaped or structured differently than described above, can be used with the vinyl alcohol copolymers described herein. Additionally, the mold members can be configured to comprise more than one lens forming region. For example, a single mold member can be configured to comprise a region configured to mold an anterior lens surface as well as a posterior lens surface, i.e., to act as either a female or male mold member.

The vinyl alcohol copolymer can be used to form at least one molding surface, or mold member or mold assembly (i.e., at least one mold) for molding polymeric ophthalmic device bodies. The at least one mold can be produced by conventional injection molding procedures known to persons of ordinary skill in the art. For example, a quantity of the vinyl alcohol copolymer can be heated to form a molten thermoplastic polymer. The molten thermoplastic polymer can be dispensed into a mold cavity in the shape of an ophthalmic device mold. In one example, the mold cavity can include one or two optical quality contact lens forming molding surfaces. The molding surfaces used to form the optical quality lens-forming molding surfaces of the mold can be provided as components of one or more removable inserts located in a plate or other housing, or can be machined as part of the molding cavity.

In one example, the process settings used to injection mold the vinyl alcohol copolymer of the present disclosure content can include:
  Melt temperature from about 160° C. to about 250° C.
  Barrel temperature from about 160° C. to about 250° C.
  Throat temperature from about 30° C. to about 70° C.
  Mold tool temperature from about 30° C. to about 95° C.
  Holding time from about 1 second to about 5 seconds
  Injection speed from about 50 mm/second to about 250 mm/second
  Plasticizing speed from about 100 mm/second to about 300 mm/second
  Injection pressure from about 50 bar to about 180 bar
  Holding pressure from about 10 bar to about 200 bar
  Back pressure from about 5 bar to about 25 bar.

For example, at least two of these process settings can be used to injection mold the vinyl alcohol copolymer. In another example, three, four, five, six, seven, eight, nine, ten, or all of these process settings can be used to injection mold the vinyl alcohol polymer. In one example, the melt temperature can be from about 160° C. to about 220° C., and the barrel temperature from about 160° C. to about 220° C. In another example, the melt temperature can be from about 180° C. to about 250° C., and the barrel temperature from about 180° C. to about 250° C.

The at least one mold member can be produced by a combination of injection molding and machining, for example, lathing or ablating, where the basic shape of the mold is prepared by injection molding, and all or a portion of the device-forming molding surface is prepared by removing a portion of the mold, for example by machining a portion of the mold, such as, for example, all or a part of the region of the mold used to mold an optical zone of an ophthalmic device. In other words, in accordance with the present disclosure, the device-forming molding surfaces of the at least one mold member can be formed completely by injection molding one or more vinyl alcohol copolymers, can be formed completely by machining a portion of at least one vinyl alcohol copolymer, or can be formed by injection molding at least one vinyl alcohol copolymer to form a mold member, a region of the device-forming molding surface of which is subsequently machined to form the final device-forming molding surface of the vinyl alcohol copolymer mold member. Thus, in one example, injection molding the at least one of the first mold member and the second mold member can comprise forming a non-molding portion of at least one of the first mold member and the second mold member by injection molding, and forming a device-forming molding surface of the at least one of the first mold member and the second mold member by machining or lathing or ablating or any combination thereof the non-molding portion of the mold member.

The vinyl alcohol copolymer can be used to form at least a device-forming molding surface of a mold member, where at least some of the non-molding regions of the mold member (i.e., regions of the mold which are not used to form a surface of a device body) are formed of a material other than the vinyl alcohol copolymer. In one example, a non-molding portion of the mold member can be formed of a material that is essentially insoluble in water or aqueous solutions, such as, for example a metal or polymeric material such as polypropylene. In one example, the non-molding portion can comprise a frame or support for a device-forming molding surface comprising the vinyl alcohol copolymer. The vinyl alcohol copolymer can be used to form the entire device-forming molding surface, or can be used to form a portion of the device-forming molding surface, such as a layer of a multi-layer device-forming molding surface, where the vinyl alcohol copolymer layer is the portion or layer of the multilayer device-forming molding surface that directly contacts the polymerizable composition during cast molding. The portion or layer of the device-forming molding surface comprising the vinyl alcohol copolymer can be formed using various methods, such as, for example, injection molding or film casting.

Regardless of the method used to form the mold member from the vinyl alcohol copolymer, the mold member can be used to mold cosmetic contact lenses having a printed design on one of their surfaces. These cosmetic contact lenses may or may not have a vision-correction zone. Prior to placing the polymerizable composition in the mold member, a design of any sort can be placed on one or more of the lens-forming surfaces of one or more of the mold members to be used to form the lens. The design printed on the mold member can be configured to mask the appearance of the eye, change the appearance of the eye, such as, for example, change the appearance of the color of the eye, or enhance the appearance of the eye, such as is done, for example, by a limbal ring.

The design can be printed onto any lens-forming surface of the mold member, including a concave surface or a convex surface. The design can be printed onto the lens-forming surface of the mold member using any printing method, such as, for example, using ink-jet printing, using a cliché method, and the like.

The ink or pigment printed onto the mold member can be a water-based ink or pigment vehicle, or can be an organic solvent-based ink or pigment vehicle.

In one example, due to the use of the vinyl alcohol copolymer to form the mold member onto which the design is printed, a surface treatment such as, for example, a plasma treatment may not need to be applied to the molding surface in order for the design to be printed with good reproducibility onto the molding surface, although optionally a surface treatment can also be applied. In one example, the ink or pigment vehicle applied to the molding surface of the mold member does not bead up when applied to the molding surface. When the polymerizable composition is placed in contact with the printed molding surface and subsequently cured, demolded and delensed, the printing becomes integrated into the polymeric lens body and remains with the lens body following the demolding and delensing.

When forming the molding surface or mold member by injection molding, the molten thermoplastic polymer in the mold cavity can then be cooled and separated from the molding surface and subsequently moved to a station to receive a volume of a polymerizable composition to be used to form a polymeric device body.

Following formation and cooling of the molding surface or mold member, a volume of polymerizable composition is placed in one of the mold members before the mold members are combined to form the mold assembly. Typically this is accomplished by placing a predetermined quantity of the polymerizable composition onto one of the mold members, such as, for example, placing the polymerizable composition into a concave molding surface of a first mold member. The mold assembly is then assembled by placing another mold member in contact with the first mold member having the polymerizable composition, such as, for example, by placing a convex molding surface of a second mold member in contact with the first mold member such that a device-shaped cavity is formed between the first and second mold members, the device-shaped cavity containing the polymerizable composition. If used, a connection is then formed between first and second mold members by whatever means is being used in order to maintain the mold members in proper alignment during the curing process.

When two or more mold members are combined as a mold assembly, the process of assembling the mold members into a mold assembly can further comprise the step of forming a connection between the mold members or affixing the mold members to each other. The mold members can be permanently affixed to each other, or can be temporarily affixed to each other. The first mold member and the second mold member can be structured to be easily separated after being assembled together without causing substantial damage to the polymeric ophthalmic device body produced in the lens shaped cavity.

In one example, the mold members can be configured to form a mechanical connection based on the shape of elements of the mold members. For example, the mold members can be configured to form an interference fit when pressure is applied to one or both of the mold members. In another example, the mold members can both be threaded so as to form a connection by engaging the interconnecting threads between the mold members. Other examples of mechanical connections can include bores and protrusions between the mold members, or other locking structures.

In another example, the mold members can be affixed to each other using an adhesive substance placed between the mold members. The adhesive substance can comprise or consist of a thermoplastic material. The thermoplastic material can comprise or consist of the same thermoplastic material used to form at least one of the mold members to be affixed to each other. For example, a non-molding portion of one or both of the thermoplastic mold members can be deformed or melted in order to affix the mold members to each other.

In one example, a non-molding portion of one or both of the mold members can be heated in order to melt a portion of one or both of the mold members to form a weld between the mold members in order to adhere the mold members to each other. The weld formed between the mold members can comprise a single weld located in a single non-molding location between the mold members, for example, a single weld in a single spot in a peripheral region surrounding the device-shaped cavity. The weld formed between the mold members can comprise a plurality of welds, each located in a single non-molding location between the mold member, for example, 2 or 3 or 4 or 5 or more individual welds each formed in a single spot in a peripheral region, where the plurality of welds are positioned around the perimeter of the device-shaped cavity. The plurality of welds can be equidistant from each other around the perimeter of the device-shaped cavity, or can be positioned in a non-symmetric pattern. The weld formed between the mold members can comprise a single weld located around the entire perimeter of the lens forming cavity. In such an example, although the thickness of the melted thermoplastic may vary across different portions of the weld, a single continuous weld is present between the mold members in an area which completely encircles the perimeter of the device-shaped cavity formed between the mold members.

In another example, a portion of a solvent capable of dissolving one or both of the mold members can be applied to one or both of the mold members in order to dissolve a non-molding portion of one or both of the mold members in order to meld a surface of one mold member to a surface of the other mold member. As the dissolved mold material re-solidifies, the melded material can act to affix the mold members to each other. When one or more of the mold members is formed of a water-soluble polymer, the solvent can comprise or consist of water or an aqueous solution. The amount of solvent applied can be a very small portion of the solvent such as, for example, a few microliters. The solvent can be dropped onto a surface to be joined, can be sprayed onto a surface to be joined, can be stamped onto a surface to be joined, etc. For example, one or all of the mold members, prior to being placed together to form the mold assembly, can be contacted by a stamp wetted with the solvent. The stamp can be shaped to conform to the shape of the surface to be joined. For example, the stamp can be ring-shaped such that, when it contacts a non-molding region of one of the mold members surrounding the device-shaped region of the mold member, only the non-molding region of the mold member which is intended to be jointed to the other mold member is wetted. While the solvent is still wet, the mold members can be placed in contact and melded together. Optionally, pressure can be applied to the mold assembly to assist in the process of affixing the mold members to each other. The pressure can be applied for a period of time until the mold members have fully melded to each other. Optionally, heat or air can be applied to the assist in melding the mold members and drying the solvent in order to reduce the amount of time for the meld to form and the melded material to re-solidify, firmly affixing the mold members to each other to form the mold assembly In the example were a solvent is used to dissolve a portion of a mold member and form a meld between the mold members, the melded material can be located in a single non-molding location between the mold members, for example, a single spot in a peripheral region surrounding the device-shaped cavity. The melded material can be located in a plurality of non-molding locations between the mold member, for example, 2 or 3 or 4 or 5 or more individual spots in a peripheral region, where the plurality of locations are positioned around the perimeter of the device-shaped cavity. The plurality of locations can be equidistant from each other around the perimeter of the device-shaped cavity, or can be positioned in a non-symmetric pattern. The region of melded material formed between the mold members can be a single continuous region located around the entire perimeter of the device-shaped cavity. In such an example, although the thickness of the melded thermoplastic may vary across different portions of the adhered region, a single continuous region of melded material can be present between the mold members and can completely encircle the perimeter of the device-shaped cavity formed between the mold members.

In another example, an adhesive substance such as a form of glue, contact cement or sealant can be used to form a bond between the mold members. In yet another example, the mold members can be joined using an additional element such as a clip, clamp or bracket. Regardless of the type of connection used between the mold members, the connection is intended to keep the mold members in alignment during the curing process, and can be capable of being released before the demolding process or as part of the demolding process.

When at least one of the molding surfaces or mold members of the mold assembly is formed from a water-soluble material, such as, for example, a water-soluble vinyl alcohol copolymer which is not an ethylene-vinyl alcohol copolymer, the mold members of the mold assembly can be connected in such a manner that the mold members cannot be released from each other except by at least partially dissolving at least one of the mold members of the mold assembly. In other words, the mold assembly, once formed, can be a non-opening mold assembly wherein the polymeric device body is released by dissolving all or part of the mold members comprising the mold assembly.

As at least one of the device-forming molding surfaces (of a molding surface, a mold member or the mold assembly) is formed of a material comprising or consisting of the vinyl alcohol copolymer described herein, during the process of curing the polymerizable composition to form the polymeric device body, the polymerizable composition is in direct contact with the vinyl alcohol copolymer, and at least one surface of the resulting ophthalmic device body is thus formed in direct contact with the vinyl alcohol copolymer. In some examples, when all of the device-forming molding surfaces comprise the vinyl alcohol copolymer, all the surfaces of the ophthalmic device are formed in direct contact with the vinyl alcohol copolymer.

The mold assembly having the polymerizable composition in the device-shaped cavity is then cured. Curing the polymerizable composition in the device-shaped cavity forms a polymerized reaction product in the shape of the device-shaped cavity, i.e., a polymeric device body. Curing typically comprises application of a form of electromagnetic radiation to the mold assembly including the polymerizable composition in order to cause polymerization of the polymerizable composition in the device-shaped cavity of the mold assembly. The form of electromagnetic radiation can comprise thermal radiation, microwave radiation, visible light, ultraviolet (UV) light, etc. Any combination of two or more forms of electromagnetic radiation, as well as two or more levels of one or more forms of electromagnetic radiation, can be used to cure the mold assemblies. The method of curing is usually matched to the type of initiator used in the polymerizable composition, i.e., a polymerizable composition comprising a UV initiator is usually cured using UV light, and a polymerizable composition comprising a thermal initiator is usually cured using thermal radiation, and usually at a temperature above the initiation temperature of the thermal initiator. Regardless of the method of curing that is used, the temperature during the curing process can be maintained at a temperature below the melting point of the vinyl alcohol copolymer, or below the glass transition temperature of the vinyl alcohol copolymer. The curing process typically involves curing the mold assembly until the polymerizable composition has polymerized sufficiently such that the polymeric device body will retain the shape of the device-shaped cavity following demolding and delensing. As such, the curing process may not result in complete reaction of all the polymerizable components of the polymerizable composition.

In one example, microwave radiation can be used to cure the polymerizable composition in a mold member or mold assembly formed from the at least one vinyl alcohol copolymer as described herein. Use of microwave radiation to cure the polymerizable composition in a mold formed from the vinyl alcohol copolymer can reduce the amount of time required to cure the composition as compared to the use of UV light or thermal radiation (i.e., a heated oven). For example, the time required to cure the polymerizable composition in a mold formed from the vinyl alcohol copolymer using microwave radiation can be less than or equal to 30 minutes, or less than or equal to 20 minutes, or less than or equal to 15 minutes, or less than or equal to 10 minutes. In another example, the polymerizable composition can comprise a thermal initiator such as, for example, 2,2'-azobiz (isobutyronitrile) (AIBN, VAZO®-64), and the polymerizable composition can be cured using microwave radiation. In another example, the polymerizable composition can comprise a Comfilcon A polymerizable composition containing a thermal initiator such as, for example, AIBN, and the polymerizable composition can be cured using microwave radiation. In yet another example, the polymerizable composition can be cured using microwave radiation, and the polymeric device body can be wet demolded, or wet delensed, or both wet demolded and wet delensed from the mold member formed from the vinyl alcohol copolymer. The wet demolding or wet delensing or wet demolding and delensing process can result in the mold member formed from the vinyl alcohol copolymer at least partially dissolving. In a particular example, the yield of polymeric device bodies from a manufacturing process involving using molds formed from the vinyl alcohol copolymer, curing using microwave radiation, and wet demolding and delensing can be higher than the yield of the same polymeric device bodies manufactured using the same process but using molds formed from a different material such as, for example, polypropylene, or EVOH.

In one example, thermal radiation can be used to cure the polymerizable composition in a mold member or mold assembly formed from the at least one vinyl alcohol copolymer as described herein. When thermal radiation is used to cure a polymerizable composition in at least one molding surface or mold member comprising at least one vinyl alcohol copolymer other than EVOH, the resulting polymeric device body may have a significantly lower level of adhesion force with the vinyl alcohol copolymer molding surface or mold member as compared to a molding surface or mold member formed from a different polymer such as, for example, PBT or EVOH. For example, the adhesion force can be at least 5% lower, or at least 10% lower, or at least 15% lower between the device body and the vinyl alcohol copolymer molding surface as compared to the level of adhesion force for a device body formed of the same polymerizable composition and a PBT or EVOH molding surface or mold member. In another example, it may be possible to dry demold, or dry delens, or both dry demold and delens a polymeric device body from a molding surface or mold member comprising the vinyl alcohol copolymer which is not EVOH, while it may be not be possible to dry demold, dry delens, or both dry demold and dry delens a polymeric device body formed from the same polymerizable composition but cast molded using a molding surface or mold member comprising PBT or EVOH. In another example using either wet or dry demolding and/or delensing, the yield of cosmetically acceptable polymeric device bodies from a manufacturing process involving using molds formed from the vinyl alcohol copolymer which is not EVOH can be significantly higher, e.g., at least 5% or at least 10% or at least 15% higher, than the yield of cosmetically acceptable polymeric device bodies manufactured using the same manufacturing process using the same polymerizable composition except using molding surfaces or mold members formed from PBT or EVOH.

In one example, UV radiation can be used to cure the polymerizable composition in a mold member or mold assembly formed from the at least one vinyl alcohol copolymer as described herein. When UV radiation is used to cure a polymerizable composition in at least one molding surface or mold member comprising at least one vinyl alcohol copolymer other than EVOH, the resulting polymeric device body may have a significantly lower level of adhesion force with the vinyl alcohol copolymer molding surface or mold member as compared to a molding surface or mold member formed from a different polymer such as, for example, PBT or EVOH. For example, the adhesion force can be at least 5% lower, or at least 10% lower, or at least 15% lower between the device body and the vinyl alcohol copolymer molding surface as compared to the level of adhesion force for a device body formed of the same polymerizable composition and a PBT or EVOH molding surface or mold member. In another example, it may be possible to dry demold, or dry delens, or both dry demold and delens a polymeric device body from a molding surface or mold member comprising the vinyl alcohol copolymer which is not EVOH, while it may be not be possible to dry demold, dry delens, or both dry demold and dry delens a polymeric device body formed from the same polymerizable composition but cast molded using a molding surface or mold member comprising PBT or EVOH. In another example, using wet or dry demolding and/or delensing processes, the yield of cosmetically acceptable polymeric device bodies from a manufacturing process involving using molds formed from the vinyl alcohol copolymer which is not EVOH can be significantly higher, e.g., at least 5% or at least 10% or at least 15% higher, than the yield of cosmetically acceptable polymeric device bodies manufactured using the same manufacturing process using the same polymerizable composition except using molding surfaces or mold members formed from PBT or EVOH.

As used herein, "demolding" refers to the process of separating the molding surfaces or mold members of the mold assembly following curing of the polymerizable composition. As a result of the demolding process, the molding surfaces or mold members are separated from each other, and the device body remains in contact with, or attached to, or adhered to one and only one of the molding surfaces or mold members used to cast mold the device body.

"Dry" demolding processes involve the use of mechanical processes to separate the molding surfaces or mold members of the mold assembly after curing. In dry demolding processes, the mold assembly including the polymeric device body is not contacted with a liquid, such as an organic solvent, water or an aqueous solution during the demolding process, and typically the mold assembly including the polymeric device body has not been exposed to a liquid prior to the dry demolding process. Following a dry demolding process, the polymeric device body remains in contact with one, and only one, of the molding surfaces or mold members used to mold the device body. In one example, a dry demolding process may include squeezing one or more of the molding surfaces or mold members to deform the molding surface(s) or mold member(s) and to separate the molding surfaces or mold members, leaving the polymeric device body in contact with one of the molding surfaces or mold members. If the molding surfaces or mold members of the mold assembly are held together at least in part by an interference fit between the molding surfaces or mold members, a dry demolding process may include applying pressure to one or more of the molding surfaces or mold members in order to push the molding surfaces or mold members away from each other to break the interference fit. If the molding surfaces or mold members of the mold assembly are held together at least in part by a weld between the molding surfaces or mold members, dry demolding may include cutting through or breaking apart the welded material.

"Wet" demolding processes involve application of a liquid to separate the molding surfaces or mold members of the mold assembly after curing. In wet demolding processes, the mold assembly including the polymeric device body is contacted with a liquid, such as an organic solvent, water or an aqueous solution, during the demolding process. Following a wet demolding process, the polymeric device body can remain in contact with one, and only one, of the molding surfaces or mold members used to mold the device body, or can be released from both of the molding surfaces or mold members used to mold the device body. Wet demolding processes may additionally involve the use of mechanical methods of separating the molding surfaces or mold members in addition to application of liquid to the mold assembly, including squeezing one or more of the molding surfaces or mold members to deform the molding surfaces or mold member(s), applying pressure to one or more of the molding surfaces or mold members in order to push the molding surfaces or mold members away from each other to break an interference fit, or cutting through welds or an adhesive holding the mold assemblies together. When an additional mechanical separation step is used, it is typically done after first applying the liquid to the mold assembly, such as, for example, dipping or immersing the mold assembly in a liquid.

As part of a wet or dry demolding process, it may be desired to have the device body remain in contact with a particular molding surface or mold member, such as either the first or the second mold member, following the demolding process. In order to help the device body remain in contact with the desired molding surface or mold member, heat can be applied to the first or second molding surface or mold member, for example, by blowing heated air on the back of the molding surface or mold member. Alternatively, the first or second molding surface or mold member can be chilled, for example by blowing chilled air on the back of the molding surface or mold member or applying a chilled liquid to one of the molding surfaces or mold members. An application of pressure to either the first or second molding surface or mold member before demolding or concurrently with the demolding process can also help the device body to remain in contact with a particular molding surface or mold member (i.e., the first or second molding surface or mold member) following the demolding process. In one example, when it is desired to have the polymeric device body remain in contact with the second molding surface or mold member at the end of the demolding process, heat can be applied to the back of the first molding surface or mold member immediately before or during the demolding process. The heat can be applied at a temperature below the melting point of the molding surface or mold member. The heat can be applied for a short amount of time such as, for example, less than or equal to 15 seconds, or less than or equal to 10 seconds, or less than or equal to 5 seconds.

"Delensing" refers to the process of releasing the device body from the one molding surface or mold member with which the device body remains in contact after the molding surfaces or mold members of the mold assembly have been separated in a demolding process. As used herein, "delensing" may refer to a process involving any ophthalmic device body, including an ocular insert body or a contact lens body.

"Dry" delensing processes involve the use of mechanical processes to release the device body from the one remaining molding surface or mold member with which the device body is in contact following the demolding step. In dry delensing processes, the device body and the one remaining molding surface or mold member with which the device body is in contact are not contacted by a liquid, such as an organic solvent, water or an aqueous solution, as part of the delensing process. While it is possible that a wet demolding process (involving application of a liquid to a mold assembly including a polymeric device body) may be used prior to a dry delensing process, it is more common to use a dry demolding process prior to a dry delensing process. When a dry demolding process and a dry delensing process are used together, the device body has not been exposed to a liquid, for example an organic solvent, water or an aqueous solution, until after the device body has been released from both molding surfaces or mold members of the mold assembly (i.e., released from both the first and second molding surfaces and mold members). In one example, a dry delensing process may involve the use of a vacuum apparatus to lift the polymeric device body from the one remaining molding surface or mold member with which it was in contact following the demolding step. A dry delensing process may also involve squeezing the one remaining molding surface or mold member to at least partially break the bond between the one molding surface or mold member and the lens body. A dry delensing process may involve blowing air between the edge of the device body and the molding surface or mold member to at least partially break the bond between the device body and the molding surface or mold member. A dry delensing process may involve inserting a prying tool between the edge of the device body and the molding surface or mold member to at least partially break the bond between the device body and the molding surface or mold member.

Following dry demolding and dry delensing, the polymeric device bodies may be washed (e.g., rinsed or extracted or hydrated or any combination thereof) either in an organic solvent-based liquid, or in a liquid essentially free of an organic solvent. Alternatively, following dry demolding and dry delensing, the polymeric device body can be placed directly into a package with a packaging solution, sealed, and sterilized.

"Wet" delensing processes involve the application of a liquid such as an organic solvent, water or an aqueous solution to release the device body from the one remaining molding surface or mold member with which the device body is in contact following the demolding step. After or concurrently with application of the liquid, a wet delensing process can further comprise using a vacuum apparatus to lift the polymeric device body from the one remaining molding surface or mold member with which it was in contact following the demolding step. Optionally, a wet delensing process may also include using mechanical means to assist in releasing the device body, such as, for example, squeezing the one remaining molding surface or mold member to at least partially break the bond between the one molding surface or mold member, blowing air between the edge of the device body and the molding surface or mold member, or inserting a prying tool between the edge of the device body and the molding surface or mold member to at least partially break the bond between the device body and the molding surface or mold member.

In one example, when dry demolding and dry delensing processes followed by a washing process using a liquid free of an organic solvent are used, or when wet demolding, wet delensing and washing processes using a liquid free of an organic solvent are used, the resulting device body will not have been exposed to an organic solvent during the manufacturing process. When such a device body which has not been exposed to an organic solvent is subsequently placed into a contact lens package with a packaging solution, sealed and sterilized, the resulting device product will not have been exposed to an organic solvent during its manufacturing process.

The liquid applied in the wet demolding process, the wet delensing process, or both the wet demolding and delensing process can comprise water or an aqueous solution. In one example, the aqueous solution can comprise an aqueous solution of a processing aid which increases the rate of dissolution of the vinyl alcohol copolymer. In another example, the processing aid can be a compound that assists in washing the polymeric device bodies or that assists in the removal of an extractable material from the polymeric device bodies. In yet another example, the processing aid can be a compound that helps protect the device body from damage or deformation during processing, such as, for example, a surfactant, including Tween 80.

The term "surfactant" refers to a substance which has the ability to reduce the surface tension of water, for example, water or an aqueous solution in which the substance is present. By reducing the surface tension of the water, the surfactant facilitates the water containing the surfactant, when in contact with a polymeric device body which has not previously been subjected to extraction processing with an organic solvent, to more intimately contact the device body and/or more effectively wash or remove at least one material present in the device body from the device body relative to the water without the surfactant or surfactant component. Generally, a surfactant or surfactant component does not act directly on the at least one material to solvate or dissolve the at least one material. Examples of surfactants include, without limitation, zwitterionic surfactants including forms of betaine, non-ionic surfactants including forms of polysorbate such as polysorbate 80, forms of poloxamers or poloxamines, fluorinated surfactants, and the like and mixtures thereof. In one example, one or more surfactants can be incorporated into the polymerizable compositions described herein, in washing liquids described herein, in the packaging solutions described herein, and any combination thereof.

During or following the step of applying the liquid, ultrasonic energy can be applied to the liquid, the mold assembly, the mold member(s), or the molding surface(s). In another example, the ultrasonic energy can be applied to the liquid and to a mold assembly, mold member(s), or molding surface(s) contained in a tray.

The liquid applied to the molding surface(s), or mold member(s), or mold assembly can be applied as part of a wet demolding process, or applied to a device body and one mold member as part of a wet delensing process, or applied to a device body and a molding surface as part of a wet delensing process. The temperature of the liquid can be about 90° C. or less, about 80° C. or less, about 70° C. or less, about 60° C. or less, about 50° C. or less, about 40° C. or less, or about 30° C. or less.

Following release of the polymeric ophthalmic device body from the mold assembly, e.g., from all the mold members and molding surfaces used to cast mold the device body, in one example, the vinyl alcohol polymer may no longer be present on a surface of the polymeric device body. In other words, once the device body has been released from the at least one mold member comprising the at least one vinyl alcohol polymer, a layer of the at least one vinyl alcohol polymer may not remain on a surface of the device body. The release of the device body from the at least one mold member can comprise a dry demolding step or a dry delensing step or a wet demolding step or a wet delensing step. Following release of the device body from the at least one mold member comprising the at least one vinyl alcohol polymer, a portion of the at least one vinyl alcohol polymer may remain present in solution, and the device body can be present in the solution. However, when the device body is present in the solution, the solubilized portion of the at least one vinyl alcohol polymer may not be chemically or physically attached or bonded to a surface of the device body, and thus in this example the vinyl alcohol polymer can be rinsed from the surface of the device body using a solution free of the at least one vinyl alcohol polymer. When the solubilized vinyl alcohol polymer can be rinsed from a surface of the device body in this manner, it is understood that the portion of solubilized vinyl alcohol polymer which may have been in contact with a device body surface while the device body was present in the solution does not constitute a "layer" of the vinyl alcohol polymer as used herein.

Depending upon the type of device body and the demolding/delensing processes used, following demolding and delensing, the device body may be subjected to one or more washing steps, including washing steps in an organic solvent, an aqueous solution of an organic solvent, water, or an aqueous solution essentially free of an organic solvent. The washing step can be used to clean dirt or debris from the device bodies, to extract materials from the device bodies, or to hydrate the device bodies. For example, a washing step can be used to remove diluents from the device body, to remove unreacted or partially reacted monomers from the device body, or to increase wettability of the device body.

In one example, the washing solution can comprise an organic solvent or an aqueous solution of an organic solvent. The organic solvent can comprise a volatile organic solvent such as, for example, a volatile alcohol. Examples of volatile alcohols can include lower alcohols, such as forms of methanol, ethanol, propanol, etc.

As previously discussed, the term "organic solvent" refers to an organic substance having the ability to solvate or dissolve at least one material. The organic solvent can be used to dissolve unreacted materials, diluents and the like, present in a polymeric device body which has not previously been subjected to extraction processing. In one example, the material is a material that is not soluble or does not dissolve in water or an aqueous solution. In another example, the material is a material that is not as soluble or does not dissolve as much in water or an aqueous solution, i.e., the material has increased solvation in the organic solvent as compared to water or an aqueous solution. Thus, the organic solvent in contact with such an unextracted device body is effective to solvate or dissolve at least one material present in the device body, or to increase the solvation or dissolve to a greater extent the at least one material present in the device body to reduce the concentration of the at least one material in the device body, or to reduce the concentration of the at least one material in the device body as compared to a device body treated with water or an aqueous solution. The organic solvent may be used without dilution, that is 100% organic solvent, or may be used in a composition including less than 100% organic solvent, for example and without limitation, an aqueous solution including an organic solvent. In general, an organic solvent acts, for example, directly acts, on the at least one material to solvate or dissolve the at least one material.

In another example, the washing solution can comprise water or an aqueous solution essentially free of an organic solvent. The aqueous solution essentially free of an organic solvent used to wash the present lenses can include aqueous salt solutions, buffer solutions, surfactant solutions, wetting agent solutions, comfort agent solutions, any combination thereof, and the like. In one example, one or more polymeric wetting agents or comfort agents can be used to wash the present device bodies, or in a packaging solution used with the present device bodies. However, it is understood that the present device bodies can have ophthalmically acceptably wettable surfaces when washed or packaged in an aqueous solution that does not contain any polymeric wetting agents or comfort agents. Thus, while the polymeric wetting agents or comfort agents may be used to increase the wettability of such devices, their wettability is not dependent solely upon the use of such agents.

Following release of the device body from the molding surface(s) or mold member(s) or mold assembly and, if used, one or more optional washing steps, the device body can be placed into a blister package along with a portion of packaging solution. In one example, the blister package can comprise a hydrophobic polymer. The blister package can then be sealed and sterilized, for example, by autoclaving the package under conditions suitable for sterilizing the package.

In one example, the method of manufacturing an ophthalmic device as described herein results in a yield of acceptable polymeric device bodies that is higher than a yield of acceptable polymeric device bodies made using an essentially identical method but using first and second mold members comprising an ethylene vinyl alcohol copolymer instead of the at least one vinyl alcohol copolymer of the present disclosure. The yield of acceptable device bodies can be a yield of cosmetically acceptable devices, or a yield of ophthalmically acceptable devices. The yield of acceptable devices can be a yield of devices found to be free of visually detectable defects as determined by manual visual inspection or by automated inspection using an automated inspection system. The yield of acceptable device bodies can be a yield of acceptable devices resulting from a particular processing step, such as, for example, a curing step, or a demolding step, or a delensing step, or a washing step, or a packaging step, or any combination of processing steps.

Silicone hydrogel contact lenses are based on polymerizable lens formulations that include silicon-containing monomers, including low molecular weight monomers, macromere, prepolymers or any combination thereof, and at least one hydrophilic monomer, as previously described. Some examples of silicone hydrogel contact lens materials include materials having the following USANs: acquafilcon A or aquafilcon B, balafilcon A, comfilcon A, enfilcon A, galyfilcon A, lenefilcon A, lotrafilcon A, lotrafilcon B, senofilcon A, narafilcon A, and filcon II 3. In one example, the lens body with ophthalmically acceptably wettable anterior and posterior surfaces without application of a surface treatment to the lens body, or without the presence of a interpenetrating polymeric network (IPN) of a polymeric wetting agent in the lens body is a comfilcon A silicone hydrogel contact lens body.

Ophthalmic devices comprise bodies that have surfaces, such as an anterior surface and a posterior surface. As used herein, an ophthalmically acceptably wettable ophthalmic device is a device having surfaces that are all ophthalmically acceptably wettable. Wettability refers to the hydrophilicity of one or more surfaces of a device. As used herein, a surface of a device can be considered to be ophthalmically acceptably wettable if the device receives a score of 3 or above in a wettability assay conducted as follows. An ophthalmic device is dipped into distilled water, removed from the water, and the length of time that it takes for the water film to recede from the device surface is determined (e.g., water break up time (WBUT)). The assay grades devices on a linear scale of 1-10, where a score of 10 refers to a device in which a drop takes 20 seconds or more to fall from the device. A device having a WBUT of more than 5 seconds, such as at least 10 seconds or more desirably at least about 15 seconds, can be a device having ophthalmically acceptably wettable surfaces. Wettability can also be determined by measuring a contact angle on one or both device surfaces. The contact angle can be a dynamic or static contact angle, a sessile drop contact angle, a pendant drop contact angle, or a captive bubble contact angle. Lower contact angles generally refer to increased wettability of a device surface. For example, an ophthalmically acceptably wettable surface of a device can have a contact angle less than about 120 degrees. However, in certain examples, the devices can have a contact angle no greater than 90 degrees, and in further examples, the device can have an advancing contact angle less than about 80 degrees.

The ophthalmic devices cast molded using a vinyl alcohol copolymer disclosed herein can have ophthalmically acceptably wettable surfaces when fully hydrated, and may not require application of a surface treatment or the presence of an IPN or pseudo-IPN of a polymeric wetting agent in the device body in order for the lens to have ophthalmically acceptably wettable surfaces. However, application of a surface treatment to the device or the presence of an IPN or pseudo-IPN of a polymeric wetting agent in the device body can be used to further increase the wettability of the device surfaces above a level that is considered ophthalmically acceptably wettable.

An "ophthalmically compatible silicone hydrogel device" refers to a silicone hydrogel ophthalmic device, such as a contact lens, that can be worn on a person's eye without the person experiencing or reporting substantial discomfort, including ocular irritation and the like. When the device is a contact lens, such lenses often have an oxygen permeability, a surface wettability, a modulus, a water content, an ionoflux, a design, and any combination thereof, which permit the lenses to be comfortably worn on a patients eye for extended periods of time, such as for at least a day, at least a week, at least two weeks, or about a month without requiring removal of the lens from the eye. Typically, ophthalmically compatible silicone hydrogel devices do not cause or are not associated with significant corneal swelling, corneal dehydration ("dry eye"), superior-epithelial arcuate lesions ("SEALs"), or other significant discomfort. Ophthalmically compatible silicone hydrogel contact lenses meet clinical acceptability requirements for daily wear or extended wear contact lenses.

Ophthalmically compatible silicone hydrogel devices have ophthalmically acceptably wettable surfaces, although a device with ophthalmically acceptably wettable surfaces may not necessarily be ophthalmically compatible. A silicone hydrogel contact device having an "ophthalmically acceptably wettable surface" can be understood to refer to a silicone hydrogel device that does not adversely affect the tear film of a device wearer's eye to a degree that results in the device wearer experiencing or reporting discomfort associated with placing or wearing the silicone hydrogel device on an eye.

A method of manufacturing ophthalmic devices, for example, silicone hydrogel contact lenses, is illustrated in FIG. 1. In accordance with the present disclosure, all of the steps illustrated in FIG. 1, or a subset of the steps illustrated in FIG. 1 can comprise a method of manufacturing contact lenses. Items which serve as inputs, outputs or both inputs and outputs of the steps of FIG. 1 are illustrated in FIG. 2.

FIG. 1 includes a step 102 of providing a vinyl alcohol copolymer of the present disclosure. The vinyl alcohol copolymer is illustrated in FIG. 2 as element 202.

Step 104 of FIG. 1 illustrates the step of using the vinyl alcohol copolymer to form at least one of a first mold member and a second mold member, or to form at least one molding surface of at least one of a first mold member and a second mold member. Element 204 of FIG. 2 illustrates the resulting mold member(s) or molding surface(s) comprising the vinyl alcohol copolymer.

FIG. 1 also includes a step 106 of placing a polymerizable composition on or in a mold member or molding surface. In reference to the present disclosure, the polymerizable composition can be understood to be a polymerizable composition, such as, for example, a silicon-containing polymerizable composition capable of forming a silicone hydrogel polymer when polymerized. The polymerizable composition is illustrated in FIG. 2 as element 206. The polymerizable composition may be understood to be a pre-polymerized or pre-cured composition suitable for polymerization.

Typically, the polymerizable composition is not polymerized before curing or polymerization of the composition. However, polymerizable compositions may be partially polymerized before undergoing a curing process. In some examples, the polymerizable composition may comprise a polymer component which becomes crosslinked with other components of the polymerizable composition during the curing process. The polymeric component can be wetting agent or comfort agent. Alternatively, the polymeric component can be a polymeric component which is not a polymeric wetting or comfort agent, which does not form an interpenetrating polymeric network or pseudo-IPN in the lens body, or which is neither a polymeric wetting or comfort agent and does not form an IPN or pseudo-IPN in the lens body.

The present polymerizable compositions can be provided in containers, dispensing devices, or mold members prior to a curing or polymerization procedure, as described herein. Referring back to FIG. 1, in step 106, the polymerizable composition is placed on a device-forming molding surface (i.e., a region used to mold a portion of an ophthalmic device such as a lens surface) of a female mold member or of a male mold. The female mold member can be understood to be a first mold member or an anterior mold member, and the male mold member can be understood to be a second mold member or a posterior mold member. For example, the female mold member comprises a molding surface that defines the anterior or front surface of a lens produced from the lens mold. The second mold member may be understood to be a male mold member or a posterior mold member. For example, the second mold member includes a molding surface that defines the posterior surface of a device such as a lens produced in the mold member (e.g., the second or male mold member can have a convex lens forming molding surface).

To form a mold assembly, the first mold member is placed in contact with a second mold member, forming a device-shaped cavity in the space between the first mold member and the second mold member. The method illustrated in FIG. 1 includes a step 108 of forming a contact lens mold assembly by placing two contact lens mold members in contact with each other to form a lens-shaped cavity therebetween. For example, with reference to FIG. 2, following execution of step 108, the polymerizable silicone hydrogel composition 206 is located in the contact lens-shaped cavity.

At step 110, the method illustrated in FIG. 1 includes curing the polymerizable composition to form a polymeric device body which is contained in a mold assembly, as illustrated in FIG. 2 as element 208. At this point in the process, the polymeric lens body has not been exposed to a liquid. In one example the polymeric lens body can be a polymerized silicone hydrogel contact lens body. During curing, the components of the polymerizable composition polymerize to form a polymeric lens body. Thus, the curing may also be understood to be a polymerizing step. The curing 110 can include exposing the polymerizable lens precursor composition to a form of electromagnetic radiation effective in polymerizing the components of the lens precursor composition. For example, the curing 110 can include exposing the polymerizable composition to polymerizing amounts of heat, microwave radiation or ultraviolet (UV) light, among other forms of electromagnetic radiation. The curing 110 can also include curing the compositions in an oxygen-free or nearly oxygen-free environment. For example, the curing 110 can occur in the presence of nitrogen or other inert gases. The curing 110 can be effective to fully polymerize the polymerizable composition, or can polymerize the polymerizable composition to a level such that the lens body when processed (e.g., demolded, delensed, washed, packaged, sterilized, etc.) is capable of retaining its molded shape adequately to serve as a contact lens.

A polymeric device body which has not been exposed to a liquid can be present at various stages in the manufacturing process, depending upon the types of demolding and delensing processes used, and whether or not one or more optional washing steps are performed. For example, a polymeric lens body which has not been exposed to a liquid can be a polymeric lens body prior to undergoing a wet demolding process, or a wet delensing process, or a wet demolding and delensing process, or an optional washing process, or any combination thereof. For example, the washing process can be a cleaning process to remove dust or debris, or an extraction process to remove a portion or substantially all of one or more extractable components from the polymeric lens body, or a hydration process to partially or fully hydrate the hydrogel lens body, or any combination thereof. For example, the polymeric lens body which has not been contacted by a liquid can comprise a lens body present in a lens shaped cavity of a mold assembly or of two molding surfaces after a curing process, or can comprise a lens body in contact with one and only one mold member following a dry demolding process, or can comprise a contact lens body in a tray or other device following dry delensing and dry delensing processes. The polymeric lens body which has not been exposed to a liquid can include a lens forming component, such as a silicon-containing polymeric network or matrix in the shape of a lens, and a removable component that can be removed from the lens body following polymerization. The removable component can be understood to include unreacted monomers, oligomers, partially reacted monomers, or other agents which have not become covalently attached or otherwise immobilized relative to the lens-forming component. The removable component can also be understood to include one or more additives, including diluents, that can be removed from the polymerized lens product during a cleaning, extraction, or hydration procedure, as discussed herein. Thus, materials of the removable component can include linear uncross-linked or slightly cross-linked or branched polymers of extractable materials that are not cross-linked to or otherwise immobilized relative to the polymer backbone, network, or matrix of the lens body.

After curing the polymerizable compositions, the method illustrated in FIG. 1 includes a step 112 of separating the polymeric device body from the mold members of the mold assembly. In one example, the process of separating the polymeric lens body from the mold member can comprise a demolding process resulting in the polymeric lens body remaining in contact with one, and only one, mold member of the mold members used to form the polymeric lens body. Following the demolding process, the polymeric lens body is located on, or remains in contact with, just one of the mold members of the mold assembly. The one and only one mold member with which the polymeric lens body remains in contact following demolding can be the mold member 204 formed using the vinyl alcohol copolymer 202, or can be a different mold member. When the step 112 of separating the polymeric lens body from the mold members comprises a demolding process, the step of separating can further include a delensing step releasing the polymeric lens body from the one and only one mold member with which it remained in contact following the demolding process. The polymeric lens body can be delensed from the male mold member or the female mold member, depending on which mold member the polymeric lens body remains in contact with following the demolding process. Alternatively, the step 112 can comprise a combination demolding and delensing process, where the lens body is released simultaneously from all of the mold members used to form it. When at least one of the mold members or molding surfaces used to form the lens body comprises a vinyl alcohol copolymer, the separating process can involve applying a liquid to the lens body and at least one mold member or molding surface (in the form of a mold assembly, a single mold member, a pair of molding surfaces or a single molding surface, the molding surface(s) being either in contact with, or separated from, the non-molding portion(s) of the mold member(s)) to at least partially dissolve the vinyl alcohol copolymer and thereby release the lens body from the mold assembly, single mold member or molding surface(s). The liquid used in a wet separation process can comprise water or an aqueous solution.

The method illustrated in FIG. 1 optionally includes a step 114 of washing the device body. The washing step can comprise contacting a polymeric lens body with a liquid, for example an organic solvent, an organic solvent solution, water or an aqueous solution free of an organic solvent, to clean dust or debris from the lens body, or to extract the lens body to remove extractable materials from the lens body, or to fully or partially hydrate the lens body, or any combination thereof. In one example, the washing step 114 can comprise a washing step to remove or dilute the liquid used during a wet demolding process, a wet delensing process, or both. The washing step 114 results in a cleaned, extracted or hydrated lens body 210, as shown in FIG. 2. The washing step 114 can optionally be conducted on a mold assembly including a polymeric lens body, a polymeric lens body remaining in contact with one mold member, a polymeric lens body which has been fully released from all the molds used to form it, and can be conducted repeatedly during the manufacturing process.

The washing step 114 can optionally include a step of hydrating the polymeric device body. The hydrating step can include contacting a polymeric lens body or one or more batches of such polymeric lens bodies with water or an aqueous solution to form a hydrated lens product, such as, for example, a silicone hydrogel contact lens. The hydration step can fully or partially hydrate the lens body. In one example, the polymeric lens body which is hydrated in the hydration step is a delensed polymeric lens body which has not been contacted by a liquid prior to the hydration step, or can comprise a polymeric lens body which has previously been contacted by a liquid.

After the separating step 112, and the optional washing step 114, the method illustrated in FIG. 1 can optionally include a step 116 of packaging the device body to produce a packaged ophthalmic device product 212. For example, a lens body can be placed in a blister pack, vial or other suitable container along with a volume of a packaging liquid, such as a saline solution, including buffered saline solutions. In one example, the washing step 114 and packaging step 116 can be conducted simultaneously by placing a polymeric lens body, including a polymeric lens body which has not previously been contacted by a liquid, in a blister package or container with a portion of packaging liquid which serves as both a packaging solution and a washing solution.

Optionally, the method illustrated in FIG. 1 can further comprise one or more inspection steps 118. In the example illustrated in FIG. 1, the inspection step is conducted following the packaging step, before the package is sealed and sterilized, although the one or more inspection steps can be conducted at any point in the process, either before curing or after curing, on a dry device body or a wet device body. For example, an inspection can be performed on one or more mold members to determine the acceptability of the molding surfaces, can be performed on a mold member following placing of the polymerizable composition to detect the presence of bubbles in the polymerizable composition, on a dry lens following curing to determine the acceptability of the dry lens body, or on a wet lens body following separating, washing or packaging to determine the acceptability of the wet lens body. The result of optional inspection step(s) 118 as illustrated in FIG. 1 is a packaged inspected body 214, but in other processes can comprise an inspected mold member, an inspected polymerizable composition in a mold member, an inspected dry lens body, or an inspected wet lens body.

Following the step 116 of packaging the device body, the blister pack or container containing the packaged device body 212 can be sealed, and subsequently sterilized, as shown in optional step 120 of FIG. 1, to produce a sterilized package comprising an ophthalmic device product such as, for example, a contact lens. The packaged device body can be exposed to sterilizing amounts of radiation, including heat such as by autoclaving, gamma radiation, e-beam radiation, ultraviolet radiation, and the like. Depending upon the previous process steps used, the sterilization process can also serve to partially or fully extract, fully hydrate, or both extract and hydrate the packaged device body, or to dissolve the mold member(s) or molding surface(s) comprising the vinyl alcohol copolymer.

The following non-limiting Examples illustrate certain aspects of the present methods and devices.

Example 1

Comparative, Theoretical

A quantity of ethylene-vinyl alcohol copolymer is provided in granular or pellet form. A portion of the polymer is processed by conventional injection molding into first and second contact lens mold members. A polymerizable composition for producing silicone hydrogel contact lenses is prepared as described herein, and is used to prepare a plurality of cast-molded polymerized silicone hydrogel lens bodies as illustrated in FIG. 1. The mold assemblies including the polymerizable composition are cured using thermal or UV radiation. After curing, the mold assemblies including the cast-molded polymerized lens bodies are wet or dry demolded to separate the two mold members of the mold assembly. Following the dry demolding step, a wet delensing process is used to release the polymerized lens bodies from the one mold member with which they remain in contact following the demolding step. The released lens bodies are subsequently either washed using a liquid comprising an organic solvent followed by an aqueous solution essentially free of an organic solvent, or are washed using an aqueous solution essentially free of an organic solvent. The washing step can include an additional hydration step, or a separate hydration step can be included before the lens bodies are packaged and sterilized. The yield of acceptable lens bodies is below about 65%.

Example 2

Theoretical

A quantity of vinyl alcohol copolymer is provided in granular or pellet form. A portion of the polymer is processed by conventional injection molding into contact lens mold members. A polymerizable composition for producing silicone hydrogel contact lenses is prepared as described herein, and is used to prepare a plurality of cast-molded polymerized silicone hydrogel lens bodies as illustrated in FIG. 1. The mold assemblies including the polymerizable composition are cured using thermal, microwave or UV radiation. After curing, the mold assemblies including the cast-molded polymerized lens bodies are wet or dry demolded to separate the two mold members of the mold assembly. Following the dry demolding step, a wet delensing process is used to release the polymerized lens bodies from the one mold member with which they remain in contact following the demolding step. The released lens bodies are subsequently either washed using a liquid comprising an organic solvent followed by an aqueous solution essentially free of an organic solvent, or are washed using an aqueous solution essentially free of an organic solvent. The washing step can include an additional hydration step, or a separate hydration step can be included before the lens bodies are packaged and sterilized. The yield of acceptable lens bodies is greater than about 75%. When the manufacturing process involving minimal handling of the lens body, where the mold assembly is placed in the blister package and the lens body is demolded and delensed by dissolving the mold assembly in the blister package, followed by washing the lens body in the blister package, the yield of acceptable lens bodies is greater than about 85%.

Example 3

Theoretical

A quantity of Nichigo G-Polymer™ vinyl alcohol copolymer is provided in granular or pellet form. A portion of the polymer is processed by conventional injection molding into male and female contact lens mold members. A polymerizable composition for producing silicone hydrogel contact lenses is prepared as described herein, and is used to prepare a plurality of cast-molded polymerized silicone hydrogel lens bodies as illustrated in FIG. 1. The mold assemblies including the polymerizable composition are cured using thermal or UV radiation. After curing, the mold assemblies including the cast-molded polymerized lens bodies are simultaneously wet demolded and delensed by placing the mold assembly including the polymeric lens body into a tray, and applying liquid to the mold assembly to at least partially dissolve the vinyl alcohol copolymer, thereby releasing the lens body from both molds of the mold assembly. Optionally, the mold assemblies, the mold members, or the liquid can be agitated during the demolding and delensing steps. The released lens bodies are subsequently transferred to a blister package with packaging solution, and are sealed and sterilized.

What is claimed is:

1. A method of manufacturing a silicone hydrogel ophthalmic device, comprising:
    providing a polymerizable composition, the polymerizable composition comprising
        (a) at least one siloxane monomer,
        (b) at least one hydrophilic monomer, and
        (c) at least one crosslinking agent;
    polymerizing the polymerizable composition in an ophthalmic device mold assembly to form a polymeric ophthalmic device body, wherein at least one mold member of the ophthalmic device mold assembly comprises at least one vinyl alcohol copolymer which is not an ethylene-vinyl alcohol copolymer;
    contacting the polymeric ophthalmic device body with a washing liquid to remove extractable material from the polymeric ophthalmic device body; and
    packaging the polymeric ophthalmic device body in an ophthalmic device packaging solution in an ophthalmic device package.

2. The method of claim 1, wherein the silicone hydrogel ophthalmic device is a silicone hydrogel contact lens, the ophthalmic device mold assembly is a contact lens mold assembly, the polymeric ophthalmic device body is a polymeric contact lens body, the ophthalmic device packaging solution is a contact lens packaging solution, and the ophthalmic device package is a contact lens package.

3. The method of claim 1, wherein, following release of the polymeric device body from the mold assembly, a layer of the at least one vinyl alcohol copolymer is not present on a surface of the polymeric device body.

4. The method of claim 1, wherein, following release of the polymeric device body from the mold assembly, the device body is present in a solution comprising the at least one vinyl alcohol copolymer.

5. The method of claim 1, wherein the at least one vinyl alcohol copolymer comprises a highly amorphous vinyl alcohol copolymer having a level of crystallinity less than 35%.

6. The method of claim 1, wherein the at least one vinyl alcohol copolymer comprises a water-soluble vinyl alcohol copolymer.

7. The method of claim 1, further comprising the step of releasing the polymeric ophthalmic device body from the at least one mold member of the ophthalmic device mold assembly that comprises the at least one vinyl alcohol copolymer which is not an ethylene-vinyl alcohol copolymer, the step of releasing the device body from the at least one mold member comprising a wet demolding step, a wet delensing step, or a wet demolding and delensing step, wherein the wet demolding step, wet delensing step or wet demolding and delensing step results in the mold member comprising the at least one vinyl alcohol copolymer being at least partially dissolved.

8. The method of claim 1, wherein the at least one siloxane monomer comprises a siloxane monomer having at least one acrylate polymerizable functional group.

9. The method of claim 1, wherein the at least one siloxane monomer comprises a multi-functional monomer.

10. The method of claim 1, wherein the at least one siloxane monomer comprises a siloxane monomer selected from:

a monofunctional siloxane monomers represented by formula (2):

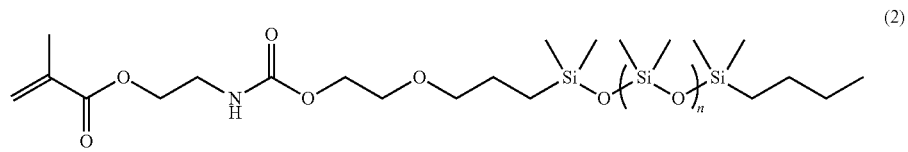

where n of formula (2) is 0-30;
a bifunctional siloxane monomer represented by formula (3):

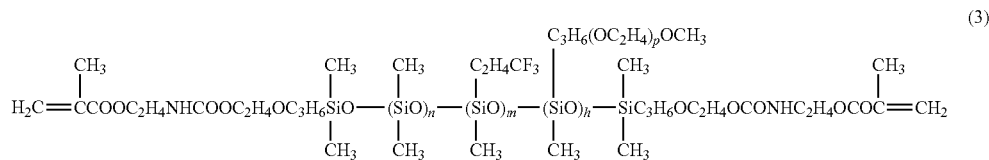

wherein n of formula (3) is an integer of about 100-150, m of formula (3) is an integer of about 5 to about 10, h is an integer of about 2 to 8, and p is an integer of 1 to 200;
a monofunctional siloxane monomer represented by formula (4):

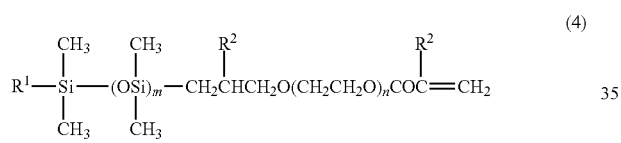

wherein m of formula (4) represents one integer from 3 to 10, n of formula (4) represents one integer from 1 to 10, $R^1$ of formula (4) is an alkyl group having from 1 to 4 carbon atoms, and each $R^2$ of formula (4) is independently either a hydrogen atom or a methyl group; a bifunctional siloxane monomer represented by formula (5):

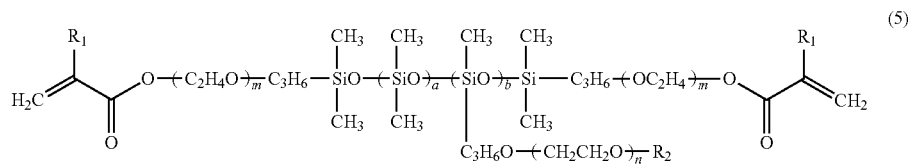

wherein $R_1$ of formula (5) is selected from either hydrogen atom or a methyl group; $R_2$ of formula (5) is selected from either of hydrogen atom or a hydrocarbon group having 1 to 4 carbon atoms; m of formula (5) represents an integer of from 0 to 10; n of formula (5) represents an integer of from 4 to 100; a and b represent integers of 1 or more; a+b is equal to 20-500; b/(a+b) is equal to 0.01-0.22; and the configuration of siloxane units includes a random configuration; a bifunctional siloxane monomer represented by formula (6):

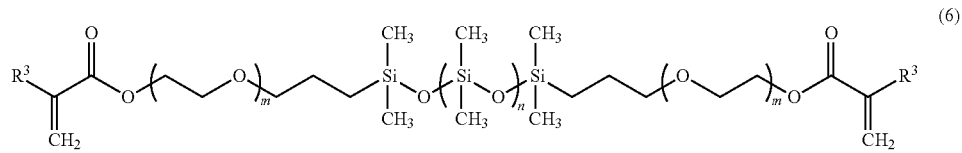

wherein R3 is selected from either hydrogen atom or a methyl group, m of formula (6) represents an integer from 0 to 15, and n of formula (6) represents an integer from 1 to 500; and a bifunctional siloxane monomer represented by formula (7) having a molecular weight of about 4,500 to about 5,500:

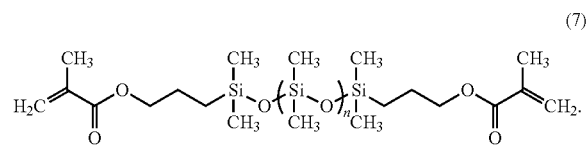

11. The method of claim 1, wherein the at least one siloxane monomer of the polymerizable composition comprises a siloxane monomer component comprising a first siloxane monomer and a second siloxane monomer having a different molecular weight than the at least one first siloxane monomer.

12. The method of claim 1, wherein the at least one hydrophilic monomer comprises a vinyl amide-containing monomer.

13. The method of claim 1, wherein the at least one hydrophilic monomer comprises a vinyl ether-containing monomer.

14. The method of claim 1, wherein the at least one crosslinking agent comprises a vinyl-containing crosslinking agent.

15. The method of claim 1, wherein the at least one mold member of the ophthalmic device mold assembly that comprises at least one vinyl alcohol copolymer which is not an ethylene-vinyl alcohol copolymer, is formed by injection molding.

16. The method of claim 1, wherein the polymerizable composition further comprises at least one hydrophobic ethylene glycol methyl ether methacrylate-containing monomer.

17. The method of claim 1, wherein the polymerizable composition further comprises a tinting agent, a UV-blocking agent, or both a tinting agent and a UV-blocking agent.

18. The method of claim 1, wherein the at least one mold member of the ophthalmic device mold assembly comprising at least one vinyl alcohol copolymer which is not an ethylene-vinyl alcohol copolymer is formed by injection molding the at least one vinyl alcohol copolymer using a process setting selected from the group consisting of: melt temperature from about 180° C. to about 250° C., barrel temperature from about 180° C. to about 250° C., throat temperature from about 30° C. to about 70° C., mold tool temperature from about 30° C. to about 95° C., holding time from about 1 second to about 5 seconds, injection speed from about 50 mm/second to about 250 mm/second, plasticizing speed from about 100 mm/second to about 300 mm/second, injection pressure from about 50 Bar to about 180 Bar, holding pressure from about 10 Bar to about 200 Bar, back pressure from about 5 Bar to about 25 Bar, and any combination thereof.

19. A packaged silicone hydrogel contact lens product, comprising:
  a polymeric contact lens body that is a reaction product of
    a polymerizable composition, the polymerizable composition comprising
    (a) at least one siloxane monomer,
    (b) at least one hydrophilic monomer, and
    (c) at least one crosslinking agent;
  a portion of contact lens packaging solution comprising at least one water-soluble vinyl alcohol copolymer; and
  a contact lens package configured to contain a contact lens body in the portion of contact lens packaging solution.

* * * * *